(12) United States Patent
Cannistraro

(10) Patent No.: US 10,021,337 B2
(45) Date of Patent: Jul. 10, 2018

(54) SYSTEMS AND METHODS FOR SAVING AND RESTORING SCENES IN A MULTIMEDIA SYSTEM

(71) Applicant: Apple Inc., Cupertino, CA (US)

(72) Inventor: Alan C. Cannistraro, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/705,065

(22) Filed: Sep. 14, 2017

(65) Prior Publication Data

US 2018/0070044 A1 Mar. 8, 2018

Related U.S. Application Data

(63) Continuation of application No. 14/970,292, filed on Dec. 15, 2015, now Pat. No. 9,794,505, which is a
(Continued)

(51) Int. Cl.
*H04N 7/00* (2011.01)
*H04N 5/44* (2011.01)
(Continued)

(52) U.S. Cl.
CPC .......... *H04N 5/4403* (2013.01); *G08C 17/00* (2013.01); *H04N 5/60* (2013.01); *H04N 7/035* (2013.01);
(Continued)

(58) Field of Classification Search
CPC .......... G08C 17/00; G08C 2201/30; G08C 2201/33; H04N 2005/4435; H04N 2005/4444; H04N 21/25808; H04N 21/4131; H04N 21/42209; H04N 21/4222; H04N 21/4224; H04N 21/43615; H04N 21/482; H04N 21/485; H04N 21/6543; H04N 21/6547; H04N 21/6582; H04N 21/84
(Continued)

(56) References Cited

U.S. PATENT DOCUMENTS 5,909,183 A 6/1999 Borgstahl et al.
5,924,486 A 7/1999 Ehlers et al.
(Continued)

OTHER PUBLICATIONS

Final Office Action dated Feb. 17, 2012 in U.S. Appl. No. 12/202,796. 13 pages.
(Continued)

*Primary Examiner* — Ojiako Nwugo
(74) *Attorney, Agent, or Firm* — Kilpatrick Townsend & Stockton LLP

(57) ABSTRACT

Systems and methods for saving and restoring scenes in a multimedia system with minimal configuration are provided. The techniques of the present invention can allow the states of the components in the multimedia system to be captured in a scene. Once the scene has been saved, the scene can be restored at a later time. A remote control system for recommending scenes by comparing states of components in the current scene with states of components in saved scenes is also provided. The remote control system can also recommend scenes based on usage patterns. Moreover, the remote control system can allow users to designate one or more saved scenes as favorite scenes.

20 Claims, 27 Drawing Sheets

Related U.S. Application Data continuation of application No. 13/954,787, filed on Jul. 30, 2013, now Pat. No. 9,288,422, which is a continuation of application No. 12/202,796, filed on Sep. 2, 2008, now Pat. No. 8,519,820.

(51) Int. Cl.

| | | |
|---|---|---|
| *H04N 7/08* | (2006.01) | |
| *H04N 5/60* | (2006.01) | |
| *H04N 21/84* | (2011.01) | |
| *H04N 21/658* | (2011.01) | |
| *H04N 21/6547* | (2011.01) | |
| *H04N 21/6543* | (2011.01) | |
| *H04N 21/485* | (2011.01) | |
| *H04N 21/436* | (2011.01) | |
| *H04N 21/41* | (2011.01) | |
| *H04N 21/258* | (2011.01) | |
| *H04N 7/035* | (2006.01) | |
| *G08C 17/00* | (2006.01) | |
| *H04N 21/482* | (2011.01) | |
| *H04N 21/422* | (2011.01) | |

(52) U.S. Cl.
CPC ......... *H04N 7/08* (2013.01); *H04N 21/25808* (2013.01); *H04N 21/4131* (2013.01); *H04N 21/4222* (2013.01); *H04N 21/42209* (2013.01); *H04N 21/43615* (2013.01); *H04N 21/485* (2013.01); *H04N 21/6543* (2013.01); *H04N 21/6547* (2013.01); *H04N 21/6582* (2013.01); *H04N 21/84* (2013.01); *G08C 2201/30* (2013.01); *G08C 2201/33* (2013.01); *H04N 21/42224* (2013.01); *H04N 21/482* (2013.01); *H04N 2005/4435* (2013.01); *H04N 2005/4444* (2013.01)

(58) Field of Classification Search
USPC ......... 340/12.22, 12.23, 12.24, 12.28, 12.29, 340/13.2, 13.21; 348/460
See application file for complete search history.

(56) References Cited

U.S. PATENT DOCUMENTS

| | | |
|---|---|---|
| 6,323,846 B1 | 11/2001 | Westerman et al. |
| 6,604,023 B1 | 8/2003 | Brown et al. |
| 7,136,709 B2 | 11/2006 | Arling et al. |
| 7,187,279 B2 | 3/2007 | Chung |
| 2002/0116471 A1 | 8/2002 | Shteyn |
| 2003/0009567 A1 | 1/2003 | Farouk |
| 2003/0023435 A1 | 1/2003 | Josephson |
| 2005/0035846 A1* | 2/2005 | Zigmond ............... G08C 17/02 340/5.22 |
| 2005/0097618 A1 | 5/2005 | Arling et al. |
| 2005/0231134 A1* | 10/2005 | Sid ..................... H05B 37/0272 315/294 |
| 2005/0254505 A1 | 11/2005 | Chang et al. |
| 2006/0004680 A1 | 1/2006 | Robarts et al. |
| 2006/0045280 A1 | 3/2006 | Boss et al. |
| 2006/0221260 A1 | 10/2006 | Fujine et al. |
| 2007/0047481 A1 | 3/2007 | Fair et al. |
| 2007/0152983 A1 | 7/2007 | McKillop et al. |
| 2009/0023395 A1 | 1/2009 | Chang et al. |
| 2009/0152286 A1 | 6/2009 | Wilson |
| 2009/0153288 A1 | 6/2009 | Hope et al. |
| 2009/0153289 A1 | 6/2009 | Hope et al. |
| 2009/0156251 A1 | 6/2009 | Cannistraro et al. |
| 2009/0202250 A1* | 8/2009 | Dizechi ................. G08C 17/02 398/107 |
| 2012/0124474 A1 | 5/2012 | Suh et al. |
| 2014/0213205 A1 | 7/2014 | Kennedy |

OTHER PUBLICATIONS

Non-Final Office Action dated Jul. 22, 2011 in U.S. Appl. No. 12/202,796. 16 pages.
Non-Final Office Action dated Dec. 12, 2012 in U.S. Appl. No. 12/202,796. 8 pages.
Notice of Allowance dated Apr. 26, 2013 in U.S. Appl. No. 12/202,796. 8 pages.
Non-Final Office Action dated May 15, 2015 in U.S. Appl. No. 13/954,787. 37 pages.
Notice of Allowance dated Nov. 4, 2015 in U.S. Appl. No. 13/954,787. 8 pages.
"Markup—Free OnLine Dictionary of Computing," downloaded from http://foldoc.org/markup Mar. 30, 1995. 1 page.
Coombs, James H. et al., "Markup Systems and the Future of Scholarly Text Processing." Communications of the ACM. Downloaded from http://xml.coverpages.org/coombs.html Jul. 18, 2011. pp. 933-947.
Notice of Allowance dated Jun. 16, 2017 in U.S. Appl. No. 14/970,292. 9 pages.
Cannistraro et al., U.S. Appl. No. 11/955,383, filed Dec. 12, 2007.
Hope et al., U.S. Appl. No. 11/955,385, filed Dec. 12, 2007.
Kelce S. Wilson, U.S. Appl. No. 11/955,392, filed Dec. 13, 2007.

\* cited by examiner

SYSTEMS AND METHODS FOR SAVING AND RESTORING SCENES IN A MULTIMEDIA SYSTEM

CROSS-REFERENCE TO RELATED APPLICATIONS

This application is a continuation of U.S. application Ser. No. 14/970,292, entitled "SYSTEMS AND METHODS FOR SAVING AND RESTORING SCENES IN A MULTIMEDIA SYSTEM," filed Dec. 15, 2015, which is a continuation of U.S. application Ser. No. 13/954,787 now U.S. Pat. No. 9,288,422, entitled "SYSTEMS AND METHODS FOR SAVING AND RESTORING SCENES IN A MULTIMEDIA SYSTEM," filed Jul. 30, 2013, which is a continuation of U.S. application Ser. No. 12/202,796 now U.S. Pat. No. 8,519,820 entitled "SYSTEMS AND METHODS FOR SAVING AND RESTORING SCENES IN A MULTIMEDIA SYSTEM," filed Sep. 2, 2008, which is incorporated by reference in its entirety, for all purposes, herein.

BACKGROUND OF THE INVENTION

This relates to portable electronic devices and more particularly to systems and methods for saving and restoring scenes in a multimedia system. As used herein, a scene includes the states of one or more components in the multimedia system. States of components that can be captured in a scene can include, for example, the states of lights (e.g., whether they are turned on or off and their brightness levels), the states of speakers (e.g., volume level and balance), media that is playing on a media playback application, metadata associated with the media that is playing, or any other suitable states.

Remote controls, such as dedicated remote controls for controlling devices in a multimedia system, are known. Devices in the multimedia system can include consumer electronic devices, such as televisions, set-top boxes, stereo receivers, and computers, and appliances, such as lights, window shades, and fireplaces. In addition, universal remote controls have been designed to interact with a wide variety of devices, so that a single universal remote control can be used to control more than one device. For example, a universal remote control can control both a television and set-top box. Most of these remote controls communicate with the devices using infrared (IR) signals.

However, in order to configure a conventional remote control to work with multiple devices, a user must first specify the devices that are in the user's multimedia system. For example, the user may specify a TV, a stereo receiver, and a DVD player. Furthermore, although conventional remote controls can save and restore different pre-defined scenes (e.g., "watch TV," "watch DVD," and "play game"), a user has to spend time manually defining the scene (e.g., by specifying which device inputs to use, etc.).

Furthermore, in most conventional remote controls, a user must use a computer to define a scene. In some cases, however, a user may want to be able to define a scene without being restricted to using a computer. For example, the user may be watching a horror movie and may adjust the lighting and sound of the scene accordingly. The user may want to save the states of the devices so that the scene can be restored when, for example, the user watches another horror movie a few days later. The user may want to do this save instantaneously without having to use a computer.

In addition, these conventional remote controls may wait for a user to activate a certain scene instead of recommending scenes based on past activities of the user or external parameters (e.g., genre of media that is playing, time of the day, and special occasions). For example, a conventional remote control may not be able to detect that a user is viewing a horror movie, and, as a result, suggest a saved scene that has been configured for horror movies.

In view of the foregoing, it would be desirable to provide systems and methods that allow a user to save and restore scenes in a multimedia system with minimal configuration. It would also be desirable to provide suggestions of suitable recommended scenes based on states of devices in the scenes and usage patterns.

SUMMARY OF THE INVENTION

In accordance with the invention, a portable electronic device and method of operation are provided in which the device can save and restore scenes in a multimedia system with minimal configuration. The portable electronic device can additionally provide suggestions of suitable recommended scenes to the user.

In some embodiments, the portable electronic device can discover one or more components in a multimedia system that are ready to be controlled. For example, servers on each component can broadcast one or more identifiers to the portable electronic device. In response to receiving the identifiers, the portable electronic device can establish a communications link with the components.

In some embodiments, after establishing communications with the components, the portable electronic device can receive states from the components. States can include software and/or hardware settings of the components, such as, for example, the current volume setting, the current playback speed of a media item, or the current media that is playing. In response to receiving the states, the portable electronic device can provide controls to a user. In response to the user controlling the state of a component using the controls, the portable electronic device can transmit the remote control commands to the component.

In some embodiments, the portable electronic device can allow the user to save a scene, which can capture the states of components that are included in the scene. The user may customize a scene by selecting a subset of the available components in the multimedia system. For example, the user may delete components from the scene, add components to the scene, or any combination thereof. The user may also assign a label to identify the scene. In some embodiments, the portable electronic device can be configured to save updates to the scene. Updates can include, for example, changes in the states of one or more components since the scene was last saved.

In some embodiments, the portable electronic device can allow the user to restore a saved scene. In response to the user selecting to restore a saved scene, the portable electronic device can obtain the states of the components that were captured in the saved scene. The saved scene can then be restored when the portable electronic device transmits the states back to the components.

In some embodiments, the portable electronic device can recommend scenes based on comparing the states of the components in the current scene with the states of the components in the saved scenes. For example, if the portable electronic device determines that a user is watching a horror movie on "TV1", the portable electronic device can attempt to find one or more saved scenes where "TV1" is playing another horror movie.

In some embodiments, the portable electronic device can keep track of usage patterns of the saved scenes (e.g., the times and frequencies that the saved scenes are accessed by the user). In some embodiments, the portable electronic device can recommend scenes based on usage patterns. For example, the portable electronic device can determine that the current day of the week is Saturday, and can search for a saved scene that has been accessed the most on Saturdays. As another example, the portable electronic device can determine the time of day (e.g., day parting), and search for a saved scene that has been accessed the most around that time of day.

Therefore, in accordance with the present invention, there are provided systems and methods for allowing a user to save and restore scenes in a multimedia system with minimal configuration. These systems and methods can include a portable electronic device that can automatically capture states of components in the multimedia system.

There is also provided a remote control system for providing a user with recommended scenes based on states of components and usage patterns.

BRIEF DESCRIPTION OF THE DRAWINGS

The above and other features of the present invention, its nature and various advantages will be more apparent upon consideration of the following detailed description, taken in conjunction with the accompanying drawing in which.

DETAILED DESCRIPTION

Figure 1:
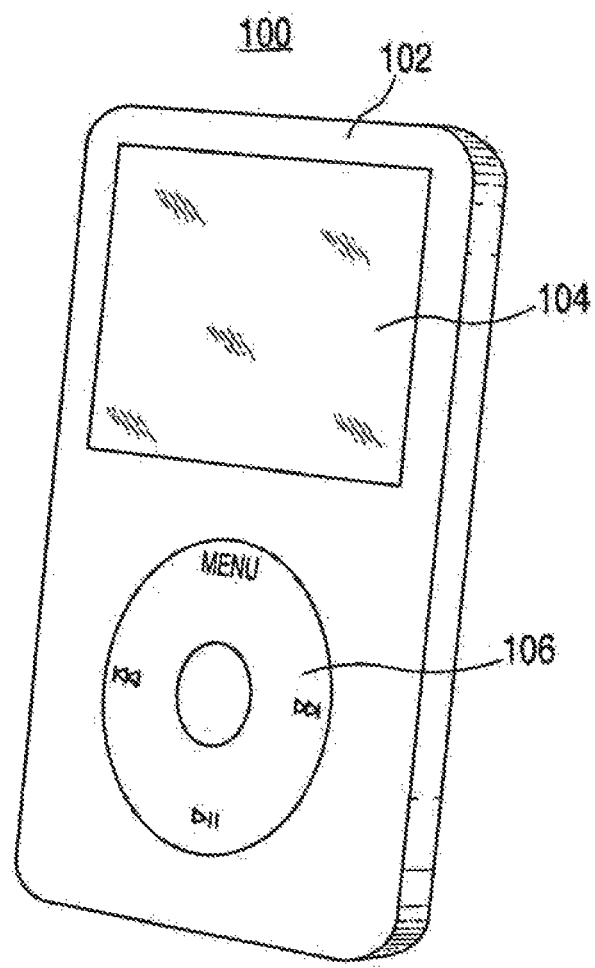
FIG. 1 shows a simplified diagram of a portable electronic system which may be operated in accordance with one embodiment of the present invention.

FIG. 1 shows a simplified diagram of a portable electronic system which may be operated in accordance with one embodiment of the present invention. Persons skilled in the art will appreciate that one or more elements of the described embodiments can be interchanged and/or combined in the present invention. Portable electronic system 100 may include portable electronic device 102. Portable electronic device 102 is shown as including display component 104 and user input component 106. However, other displays and user input components can also be utilized without departing from the spirit of the present invention.

Display component 104 is illustrated in FIG. 1 as a display screen that may be integrated into portable electronic device 102. Display component 104 does not have to be integrated into portable electronic device 102 and may also be external to portable electronic device 102. For example, display component 104 may be a computer monitor, television screen, any other graphical user interface, textual user interface, or combination thereof. Display component 104 may enable portable electronic device 102 to play back the video portion of video content, serve as part of the user interface, display command menus, or serve any other suitable display functions.

User input component 106 is illustrated in FIG. 1 as a click wheel. Persons skilled in the art will appreciate that user input component 106 may also be any other type of user input component or device, such as, for example, a mouse, keyboard, trackball, slider bar, one or more buttons, portable electronic device pad, dial, or any combination thereof. User input component 106 may also include a multi-touch screen such as that described in Westerman et al., U.S. Pat. No. 6,323,846, issued Nov. 27, 2001, entitled "Method and Apparatus for Integrating Manual Input," which is incorporated by reference herein in its entirety. User input component 106 may emulate a rotary phone or a multi-button portable electronic device pad, which may be implemented on a touch screen or the combination of a click wheel or other user input device and a screen. A more detailed discussion of such a rotary phone interface may be found, for example, in McKillop et al., U.S. Published patent application No. 2007/0152983, published Jul. 5, 2007, entitled "Touch Pad with Symbols based on Mode," which is incorporated by reference herein in its entirety.

Figure 2:
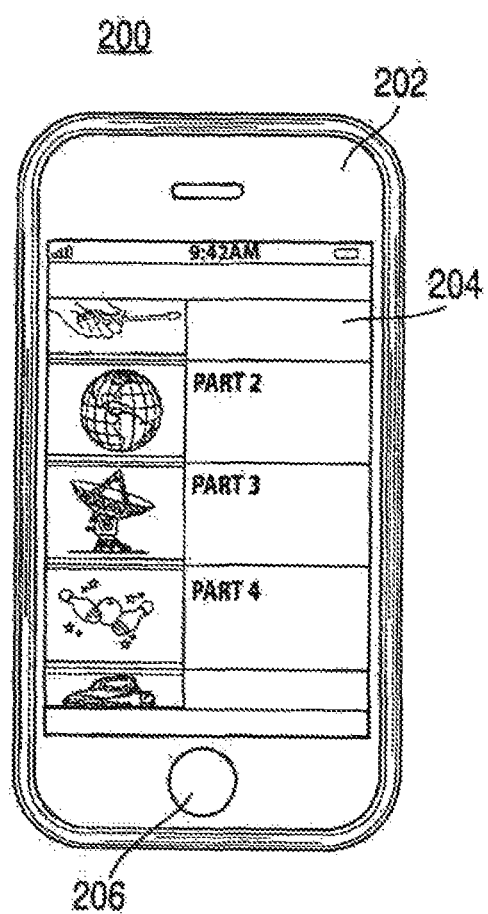
FIG. 2 shows a simplified diagram of another portable electronic system which may be used in accordance with one embodiment of the present invention.

FIG. 2 shows a simplified diagram of another portable electronic system which may be used in accordance with one embodiment of the present invention. Portable electronic system 200 may include portable electronic device 202, which may be, for example, a portable media player, cellular telephone (such as Apple's iPhone), personal organizer or any other portable electronic device. Portable electronic device 202 can include user interface component 204. User interface component 204, as shown in FIG. 2, is a multi-touch screen that may function as both an integrated display screen and as a user input device. Portable electronic device 202 may also include button 206, which may be used in conjunction with user interface component 204. Persons skilled in the art will appreciate that additional buttons or other user interface devices may be used without departing from the spirit of the present invention.

Figure 3:
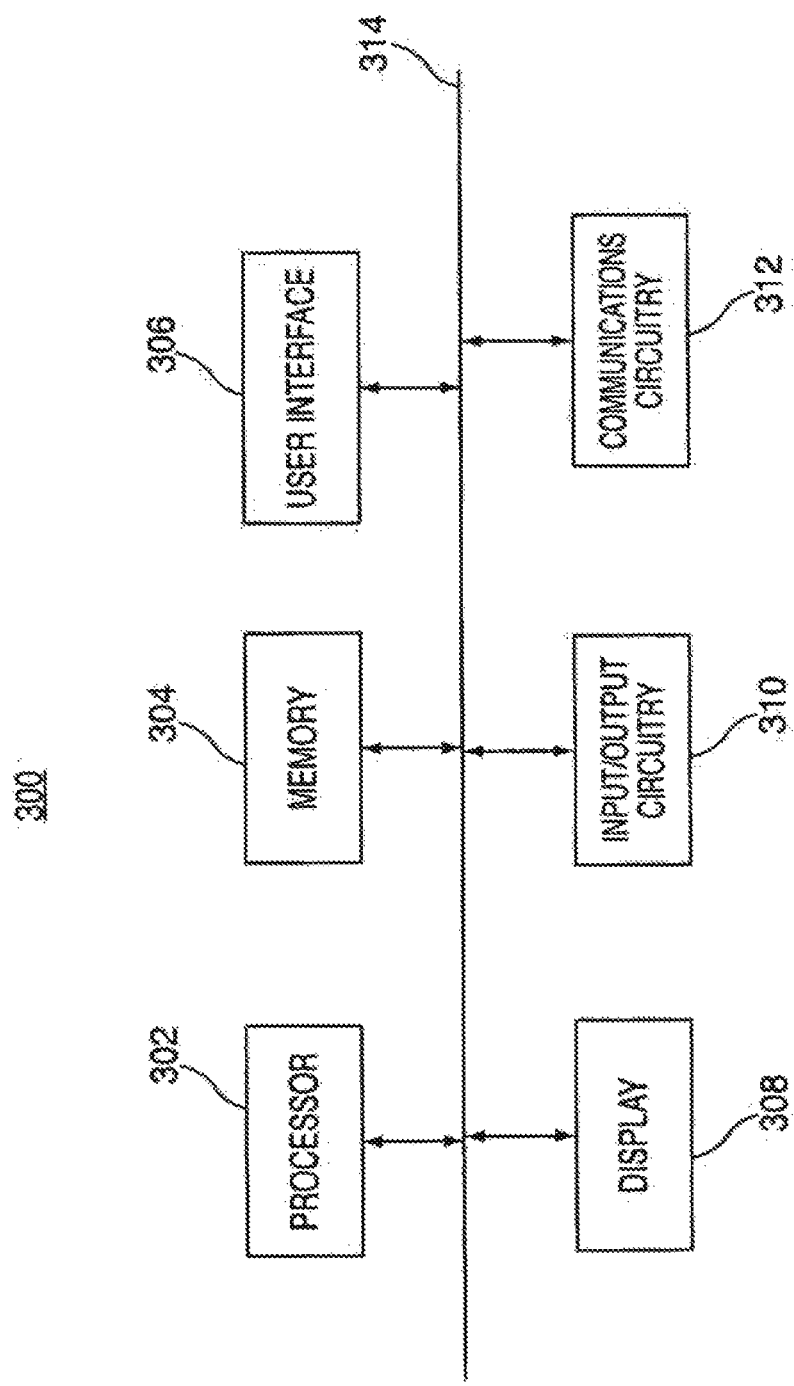
FIG. 3 shows a simplified block diagram of a portable electronic device constructed and used in accordance with one embodiment of the present invention.

FIG. 3 shows a simplified block diagram of a portable electronic device constructed and used in accordance with one embodiment of the present invention. Portable electronic device 300 can be implemented in or as any type of portable electronic device or devices, such as, for example, portable electronic devices 102 and 202 discussed above.

In some embodiments, portable electronic device 300 can be a portable computing device with remote control capabilities. For example, device 300 can be a media player with wireless communications capabilities (e.g., MP3 player), such as an iPod available from Apple Inc., of Cupertino, Calif., a cellular telephone, a personal e-mail or messaging device (e.g., a Blackberry® or a Sidekick®), a game player, a portable communication device, pocket-sized personal computers such as an iPAQ Pocket PC available by Hewlett Packard Inc., of Palo Alto, Calif., personal digital assistants (PDAs), a laptop computer, a remote ordering interface, dedicated remote control devices, global positioning system (GPS) devices, or any other suitable personal device capable of communicating wirelessly (with or without the aid of a wireless enabling accessory system). In some embodiments, portable electronic device 300 can be a portable device that combines multi-media processing and telephone functionality in single integrated unit, such as an iPhone available from Apple Inc. A more detailed discussion of a portable electronic device with remote control capabilities may be found, for example, in Cannistraro et al., U.S. patent application Ser. No. 11/955,385, filed Dec. 12, 2007, entitled "Handheld Electronic Devices with Bimodal Remote Control Functionality," which is incorporated by reference in its entirety.

Portable electronic device 300 can be battery-operated and highly portable so as to allow a user to listen to music, play games or videos, record video or take pictures, place and take telephone calls, communicate with other people or devices, control other devices, and any combination thereof. In addition, portable electronic device 300 can be sized such that it fits relatively easily into a pocket or hand of the user. By being handheld, portable electronic device 300 is relatively small and easily handled and utilized by its user and thus may be taken practically anywhere the user travels.

Portable electronic devices can include processor 302, memory 304, user interface 306, display 308, input/output circuitry 310, communications circuitry 312, and bus 314. In some embodiments, portable electronic device 300 can include more than one of each component or circuitry, but for the sake of illustration, only one of each is shown in FIG. 3. In addition, persons skilled in the art will appreciate that the functionality of certain components and circuitry can be combined or omitted and that additional components and circuitry, which are not shown in FIG. 3, can be included in portable electronic device 300. Persons skilled in the art will also appreciate that all of the components can be integrated into portable electronic device 300, or one or more of the components can be provided externally or remotely.

Processor 302 can include, for example, circuitry that can be configured to perform any function. Processor 302 can be used to run operating system applications, media playback applications, media editing applications, any other applications, or any combination thereof. Processor 302 can drive display 308 and can receive user inputs from user interface 306.

Memory 304 can include one or more different types of memory or storage mediums which can be used for performing device functions. For example, memory 304 can include cache, Flash, one or more different types of memory used for temporarily storing data, a hard-drive, tape drive, optical drive, permanent memory such as ROM (read-only memory), semi-permanent memory such as RAM (random access memory), any other suitable type of memory component, or any combination thereof. Memory 304 can be specifically dedicated to storing firmware. For example, memory 304 can be provided for storing firmware for device applications (e.g., operating system, user interface functions, and processor functions). Memory 304 can be used to store any suitable user-specific or global information that can be used by portable electronic device 300. Memory 304 can store, for example, media data (e.g., music and video files), application data (e.g., for implementing functions on device 300), preference information data (e.g., media playback preferences), lifestyle information data (e.g., food preferences), exercise information data (e.g., information obtained by exercise monitoring equipment), transaction information data (e.g., information such as credit card information), wireless connection information data (e.g., information that may enable device 300 to establish a wireless connection), subscription information data (e.g., information that keeps track of podcasts or television shows or other media a user subscribes to), contact information data (e.g., telephone numbers and e-mail addresses), calendar information data, any other suitable data, or any combination thereof. Memory 304 can store programs or applications that can be run on processor 302, can maintain files formatted to be read and edited by one or more of the applications, and can store any additional files that may aid the operation of one or more applications (e.g., files with metadata).

User interface 306 can allow a user to interact with portable electronic device 300. For example, the device for user interface 306 may take a variety of forms, such as at least one a button, keyboard/keypad, dial, a click wheel/scrollwheel, a touch screen or any combination thereof. User interface 306 can also include an audio input device (e.g., a microphone) or a video input device (e.g., a camera or a web cam) for recording. A more detailed discussion of user interaction with a portable electronic device may be found, for example, in Cannistraro et al., U.S. patent application Ser. No. 11/955,392, filed Dec. 12, 2007, entitled "Handheld Electronic Devices with Remote Control Functionality and Gesture Recognition," which is incorporated by reference in its entirety.

Display 308 can accept and/or generate signals for presenting media information (textual and/or graphic) on a display screen, such as those discussed above. For example, display 308 may include a coder/decoder (CODEC) to convert digital media data into analog signals. Display 308 also can include display driver circuitry and/or circuitry for driving display drivers. The display signals can be generated by processor 302 or display 308. The display signals can provide media information related to media data received from communications circuitry 312, any other component of portable electronic device 300, or any combination thereof. In some embodiments, display 308, like any other component discussed herein, may be integrated with and/or externally coupled to portable electronic device 300.

Input/output circuitry 310 can convert (and encode/decode, if necessary) data, analog signals and other signals (e.g., physical contact inputs, physical movements, analog audio signals, etc.) into digital data, and vice-versa. The digital data can be provided to and received from processor 302, memory 304, or any other component of portable electronic device 300. Although input/output circuitry 310 is illustrated in FIG. 3 as a single component of portable electronic device 300, a plurality of input/output circuitry may be included in portable electronic device 300. Input/output circuitry 310 can be used to interface with any input or output component, such as those discussed in connection with FIGS. 1 and 2. For example, portable electronic device 300 can include specialized input circuitry associated with input devices such as, for example, proximity sensors, accelerometers, or ambient light detectors. Portable electronic device 300 can also include specialized output circuitry associated with output devices such as, for example, one or more speakers.

Communications circuitry 312 can permit portable electronic device 300 to communicate with one or more servers, components, or other devices using any suitable communications protocol. For example, communications circuitry 312 can support Wi-Fi (e.g., a 802.11 protocol), Ethernet, protocols for other short-range wireless communications links such as Bluetooth™ (which is a trademark owned by Bluetooth Sig, Inc.), high frequency systems (e.g., 900 MHz, 2.4 GHz, and 5.6 GHz communications systems), TCP/IP (e.g., any of the protocols used in each of the TCP/IP layers), HTTP, BitTorrent, FTP, RTP, RTSP, SSH, cellular telephone communications protocols, infrared, any other communications protocol, or any combination thereof. In some embodiments, communications circuitry 312 may include a wired or wireless network interface card ("NIC") configured to connect to the Internet or any other public or private network. Communications circuitry 312 can be used to initiate and conduct communications with other devices or media players or systems within a communications network. Communications networks will be discussed in more detail in connection with FIG. 6.

Bus 314 can provide a data transfer path for transferring data to, from, or between processor 302, memory 304, user interface 306, display 308, input/output circuitry 310, and communications circuitry 312. Persons skilled in the art will appreciate that components do not have to be directly connected to each other via bus 314.

Figure 4:
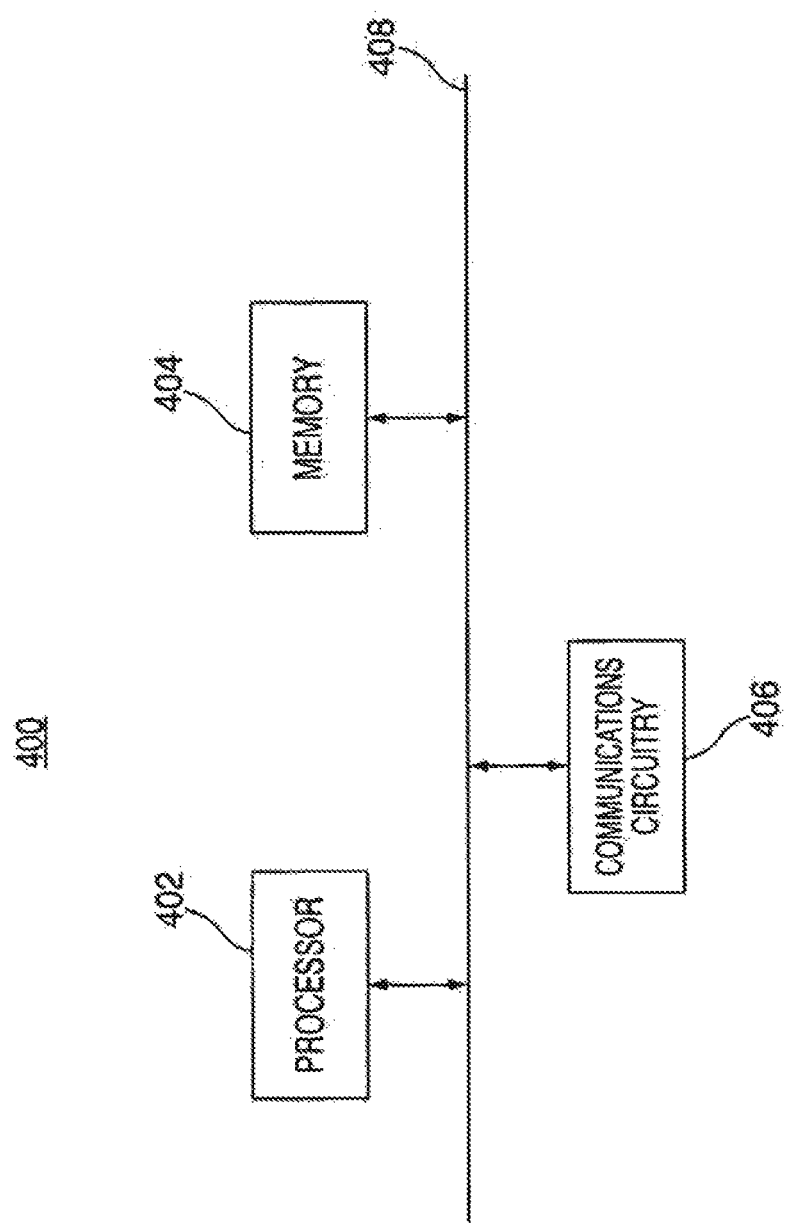
FIG. 4 shows a simplified block diagram of a device in a multimedia system that can be controlled by a portable electronic device in accordance with one embodiment of the present invention.

FIG. 4 shows a simplified block diagram of a device in a multimedia system that can be controlled by a portable electronic device in accordance with one embodiment of the present invention. Device 400 can be any suitable media device such as, for example, televisions, cable boxes (e.g., a cable receiver), handheld electronic devices with wireless communications capabilities, media players with wireless communications capabilities, satellite receivers, set-top boxes, personal computers, personal video recorders, video cassette recorders, digital video disc (DVD) players and recorders, and any other suitable media devices. In some embodiments, device 400 can be any suitable device that can be remotely controlled such as, for example, home automation controls, remote controlled light fixtures, door openers, gate openers, car alarms, automatic window shades, and fireplaces. In some embodiments, device 400 can be controlled by conventional remote controls (e.g., dedicated infrared remote controls) and a portable electronic device (e.g., portable electronic device 300 of FIG. 3).

In some embodiments, device 400 can host media and computing applications. For example, device 400 can host e-mail applications, media applications (e.g., applications that supply video, music, slideshows, and photos), media recording software, web browsers, media sharing applications, programming guide applications, software update applications, game networks, or any other suitable type of applications.

Device 400 can include processor 402, memory 404, communications circuitry 406, and bus 408. In some embodiments, device 400 can include more than one of each component or circuitry, but for the sake of illustration, only one of each is shown in FIG. 4. Persons skilled in the art will appreciate that the functionality of certain components and circuitry can be combined or omitted and that additional components and circuitry, which are not shown in FIG. 4, can be included in device 400. For example, device 400 can include a display (e.g., computer monitors, televisions, projectors), audio output devices (e.g., audio amplifiers, speakers, and headphones), user interface (e.g., keyboards, mice, touch screens, trackballs), and/or input/output circuitry.

In some embodiments, device 400 can include processor 402, which can include circuitry used to control the operation of device 400. For example, processor 402 can be implemented using microprocessors, microcontrollers, digital signal processors, application specific integrated circuits, and any other suitable integrated circuits.

Memory 404 can include one or more different types of storage. For example, memory 404 can include hard disk drive storage, nonvolatile memory (e.g., flash memory or any other electrically-programmable ROM), volatile memory (e.g., battery-based static or dynamic RAM), or any other suitable type of memory. In some embodiments, processor 402 and memory 404 can be used to run software on device 400. For example, suitable software can include remote control applications, media playback applications, operating system functions, and presentation programs.

Communications circuitry 406 can allow device 400 to communicate with one or more external devices (e.g., portable electronic device 300 of FIG. 3) using any suitable communications protocol. For example, user input and data can be transferred between portable electronic device 300 and device 400. Communications circuitry 406 can support Wi-Fi (e.g., a 802.11 protocol), Ethernet, protocols for other short-range wireless communications links such as Bluetooth™ (which is a trademark owned by Bluetooth Sig, Inc.), high frequency systems (e.g., 900 MHz, 2.4 GHz, and 5.6 GHz communications systems), TCP/IP (e.g., any of the protocols used in each of the TCP/IP layers), HTTP, BitTorrent, FTP, RTP, RTSP, SSH, cellular telephone communications protocols, infrared, any other communications protocol, or any combination thereof.

Bus 408 can provide a data transfer path for transferring data to, from, or between processor 402, memory 404, and communications circuitry 406. Persons skilled in the art will appreciate that components do not have to be directly connected to each other via bus 408.

Figure 5:
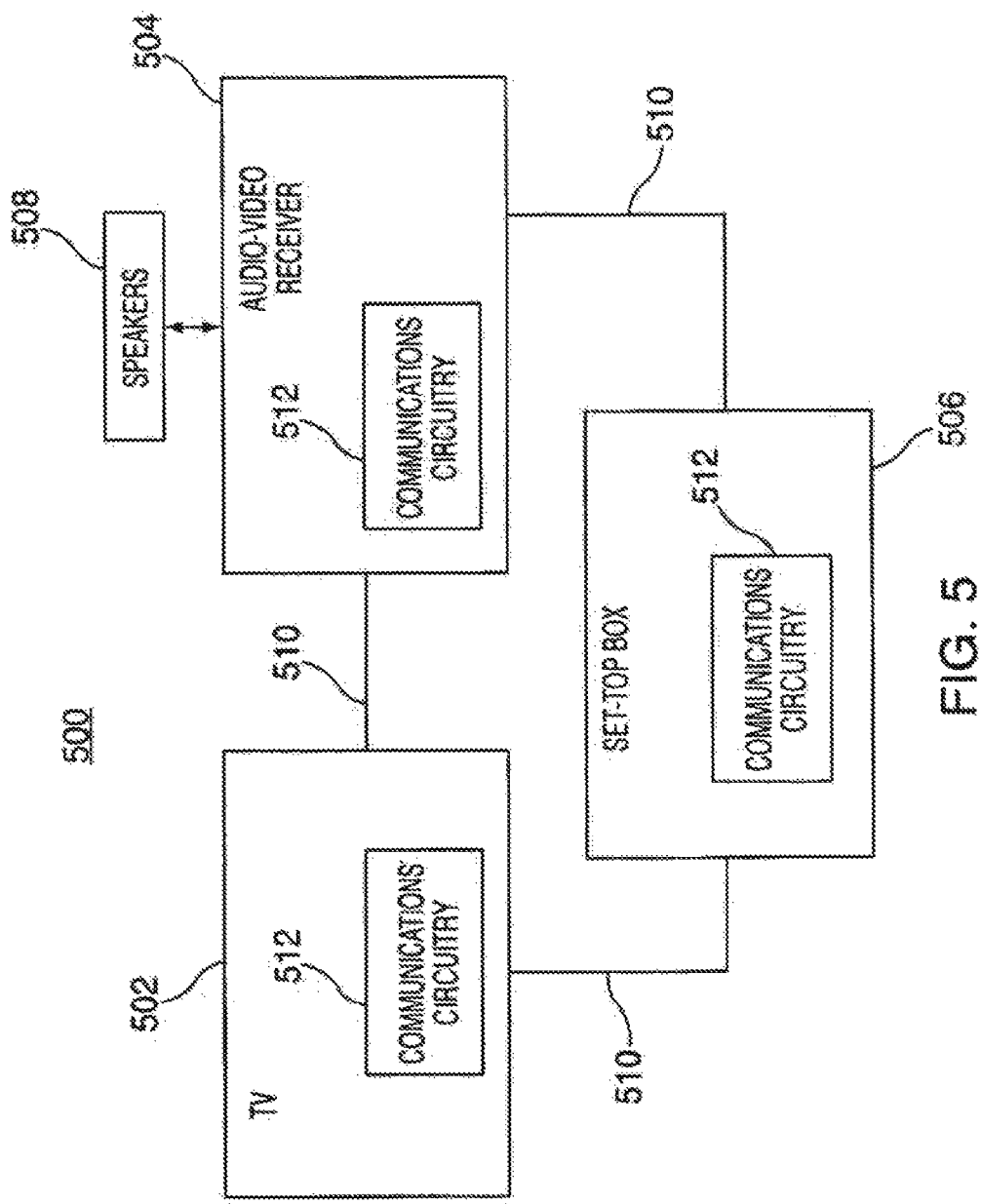
FIG. 5 shows a simplified block diagram of an illustrative multimedia system based on components that can be controlled by a portable electronic device in accordance with one embodiment of the present invention.

FIG. 5 shows a simplified block diagram of an illustrative multimedia system based on components that can be controlled by a portable electronic device in accordance with one embodiment of the present invention. As used in the following discussion, the term component will be understood to include devices (e.g., device 400 of FIG. 4) in the multimedia system and applications (e.g., e-mail applications, media applications, media recording software, web browsers, media sharing applications, programming guide applications, software update applications, or game networks) running on or accessible from these devices.

In some embodiments, users may interact with a variety of different media types using the components in the multimedia system. For example, multimedia system 500 can be used by a user to view media. Multimedia system 500 can be used to play compact disks, video disks, tapes, and hard-drive-based or flash-disk-based media files. The songs, videos, and other content maybe presented to the user using speakers and display screens. As another example, visual content such as a television program that is received from a cable provider can be displayed on a television. As yet another example, audio content such as a song can be streamed from an on-line source or can be played back from a local hard-drive.

Multimedia system 500 can include one or more components such as component 502, component 504, and component 506. Persons skilled in the art will appreciate that the components provided are merely illustrative and that any suitable components capable of communicating with the portable electronic device, which are not shown in FIG. 5, can be included in multimedia system 500.

Component 502 can include any suitable type of media display device, such as, for example, a cathode-ray tube (CRT) television, a high-definition television, plasma screen, liquid crystal display (LCD), organic light emitting diode (OLED) display, or any other suitable display device. In some embodiments, component 502 can include a television tuner. In some embodiments, a user can control the state of component 502 using a remote control. For example, the user may use a remote control to change the current television channel on the television tuner or adjust the volume produced by speakers in component 502. In some embodiments, component 502 can send audio and video signals to component 506 while simultaneously sending audio to component 504 for playback over speakers 508.

Component 504 can include any suitable type of audio-video receiving device. In some embodiments, component 504 can be an audio-video receiver that can switch among various video and audio inputs. Component 504 can be used to amplify audio signals for playback over speakers 508. In some embodiments, audio (e.g., digital or analog audio) from component 502 and component 506 can be transmitted to component 504 for amplification.

Component 506 can include a set-top box. For example, component 506 can be a cable receiver, computer-based set-top box, network-connected media playback equipment, personal video recorder, digital video recorder, digital video disc (DVD) players, or any other suitable set-top box. In some embodiments, component 506 can receive television signals from a television provider on a television signal input line. In some embodiments, a tuner in component 506 can be used to tune to a desired television channel. A video and audio signal corresponding to this channel can be provided to components 502 and 504. In some embodiments, component 506 can provide recorded content (e.g., content that has been recorded on a hard-drive) and downloaded content (e.g., video and audio files that have been downloaded from the Internet) to components 502 and 504.

In some embodiments, components 502, 504, and 506 can be connected via links 510. Links 510 can provide communication for multimedia system 500 using any suitable type of wired or wireless communication technology. For example, component 504 can receive audio signals from component 502 and component 506 via links 510. In some embodiments, links 510 can allow components in multimedia system 500 to connect to a portable electronic device (e.g., portable electronic device 300 of FIG. 3) even if those components do not have direct access to the portable electronic device. For example, components in multimedia system 500 with direct access can use links 510 to form a bridge between the portable electronic device and the components without direct access. Persons skilled in the art will appreciate that the links between the components shown in FIG. 5 are merely illustrative and that the components can be connected in any suitable manner.

Components 502, 504, and 506 can include communications circuitry 512. Communications circuitry 512 can be used to implement one or more communication protocols and can be the same as or similar to communications circuitry 406 of FIG. 4. In some embodiments, communications circuitry 512 can be used to exchange data between components in multimedia system 500 and the portable electronic device. A more detailed discussion of remote control communications protocol in a multimedia system may be found, for example, in Cannistraro et al., U.S. patent application Ser. No. 11/955,383, filed Dec. 12, 2007, entitled "Remote Control Protocol for Media Systems Controlled by Portable Devices," which is incorporated by reference in its entirety.

Figure 6:
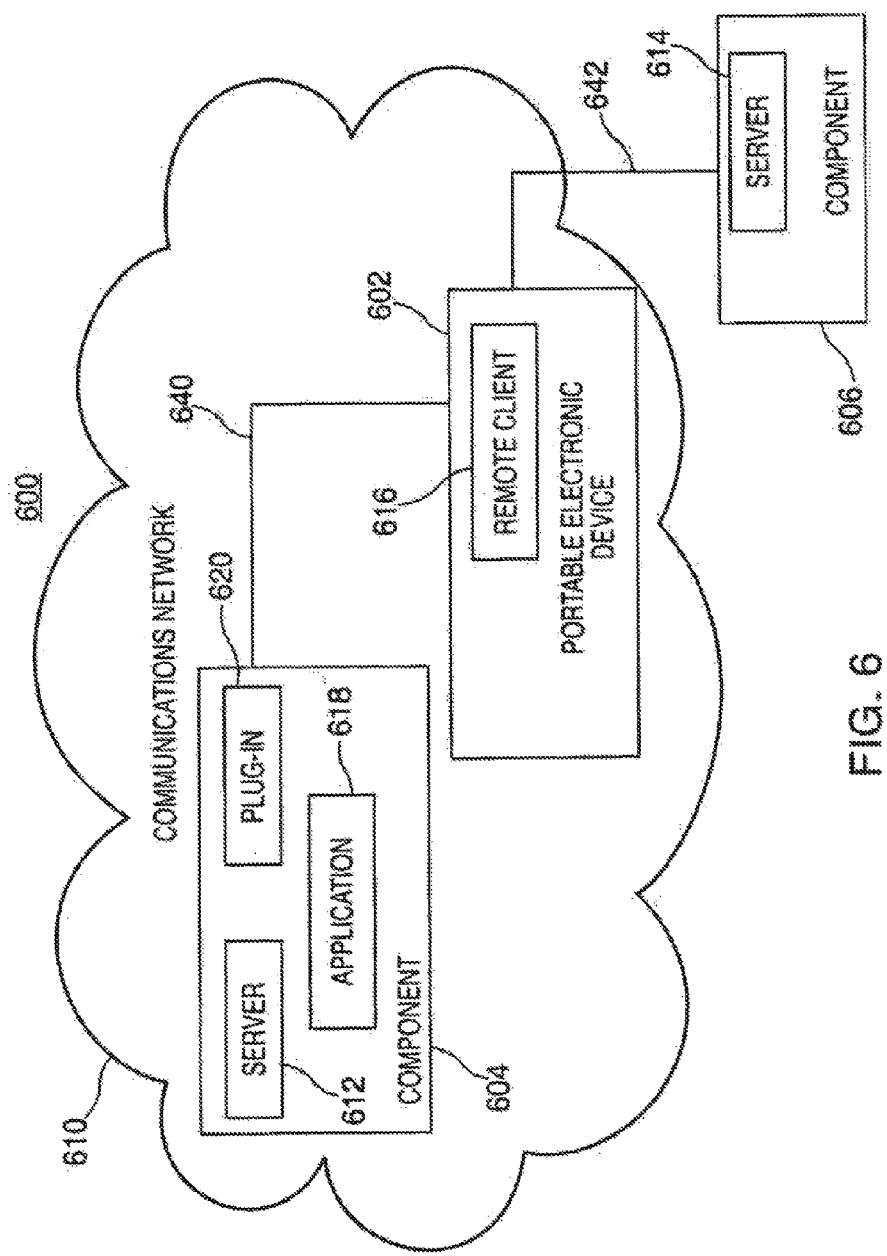
FIG. 6 shows a schematic view of a communications system which can be operated in accordance with one embodiment of the present invention.

FIG. 6 shows a schematic view of a communications system which can be operated in accordance with one embodiment of the present invention. Communications system 600 can include portable electronic device 602, component 604, and component 606. Portable electronic device 602 can be the same as or similar to portable electronic device 300 (FIG. 3). Components 604 and 606 can be components within a multimedia system. Communications network 610 can be used by portable electronic device 602 to perform wireless communications with other components within communications network 610 (e.g., component 604). Although communications system 600 can include several of portable electronic devices 602, components 604, and components 606, only one of each is shown in FIG. 6 to avoid overcomplicating the drawing.

Any suitable circuitry, device, system or combination of these (e.g., a wireless communications infrastructure including communications towers and telecommunications servers) operative to create a communications network can be used to create communications network 610. Communications network 610 can be capable of providing wireless communications using any suitable short-range or long-range communications protocol. Communications network 610 can support, for example, satellite technology, television broadcast technology, wireless universal serial bus technology, Internet, Ethernet, Wi-Fi (e.g., an 802.11 protocol), Bluetooth (registered trademark), high frequency systems (e.g., 900 MHz, 2.4 GHz, and 5.6 GHz communication systems), light-based wireless systems, sound-based wireless systems, other relatively localized wireless communication protocol, or any combination thereof.

In some embodiments, communications network 610 can support protocols used by wireless and cellular phones and personal email devices (e.g., a Blackberry®). Such protocols can include, for example, G8M, G8M plus EDGE, CDMA, quadband, and other cellular protocols. As another example, long range communications protocols can be used, such as Wi-Fi and protocols for placing or receiving calls using VOIP or LAN. Portable electronic device 602 and component 604, when located within communications network 610, can wirelessly communicate over a local wireless communication link such as link 640.

Portable electronic device 602 can be coupled with component 606 over link 642. Link 642 can be a wired link that is coupled to both portable electronic device 602 and component 606.

The communications sent and received between portable electronic device 602 and components 604 and 606 can include any suitable type of one-way or two-way communications. In some embodiments, to control the operation of components 604 and 606, portable electronic device 602 can transmit remote control signals to components 604 and 606. In addition, components 604 and 606 can broadcast data signals that can correspond to the states of the components to portable electronic device 602. Suitable states can include software and/or hardware settings that can be controlled by portable electronic device 602, such as, for example, the current volume setting and/or the current playback speed of a media item.

In some embodiments, states of components can include the locations of the components. For example, lights and TV located in the living room can broadcast to portable electronic device 602 that they are located in the living room. In some embodiments, the components can determine their locations based on GPS signals. In response to receiving the location of each component, portable electronic device 602 can build an internal map of the components and store the internal map in memory (e.g., memory 304 of FIG. 3).

In some embodiments, one or more servers on components 604 and 606 can broadcast the components' identifiers and states to portable electronic device 602. For example, components 604 and 606 can use servers 612 and 614 to broadcast media content to portable electronic device 602 (e.g., as downloaded files or streaming media). Servers 612 and 614 can use any suitable wired or wireless communications link, such as links 640 and 642, to communicate with portable electronic device 602.

The states of components 604 and 606 can be broadcast at specified times. For example, the states of components 604 and 606 can be broadcast whenever the states change. As another example, the states of the components can be broadcast at preset time intervals.

In some embodiments, portable electronic device 602 can include remote client 616, which can provide a communications interface between portable electronic device 602 and components in the multimedia system (e.g., components 604 and 606). For example, remote client 616 can transmit remote control commands to the components. As another example, remote client 616 can allow servers 612 and 614 to communicate with a remote control application on portable electronic device 602. The remote control application can be implemented using software stored in memory (e.g., memory 304 of FIG. 3) and can be executed by the processor (e.g., processor 302 of FIG. 3).

As discussed previously, some components in the multimedia system (e.g., devices) can host one or more applications. For example, component 604 can include application 618 and plug-in 620.

In some embodiments, plug-in 620 can provide application 618 with remote control functionality. For example, plug-in 620 can extract the state of application 618 and can provide the state to server 612. The state of application 618 can include both passive elements and active elements. Passive elements can include, for example, images (e.g., album covers), videos, title names, artist names, album names, or any other suitable passive elements. Active elements can include functions of an application that can be remotely controlled. For example, active elements can include a volume setting, a highlight region in a list of media items (e.g., a list of media items that a media player application can access), playback controls (e.g., play, pause, rewind, fast-forward), contrast settings, equalizer settings, and any other suitable active elements.

In some embodiments, plug-in 620 can receive a remote control command from server 612 and can perform the desired action for application 618. For example, when a remote control command from portable electronic device 602 indicates that the volume of a media playback operation in application 618 should be raised, plug-in 620 can adjust the volume accordingly. As another example, when a remote control command indicates that a user has selected a media item for playback, plug-in 620 can direct application 618 to initiate media playback of the media item.

In some embodiments, if a device hosts one or more applications that are operative to be controlled, one or more servers (e.g., server 612) on the device can broadcast the availability of the applications to portable electronic device 602. For example, server 612 can broadcast that component 604 hosts application 618, which has plug-in 620 providing remote control functionality. In some embodiments, remote client 616 can respond to the broadcast information. For example, remote client 616 can request to activate the remote control functionality. As a result, server 612 can receive remote control commands from remote client 616 and can forward the remote control commands to plug-in 620. In addition, the state of application 618 can be broadcast to remote client 616 at specified times (e.g., when the state changes or at preset time intervals).

Figure 7:
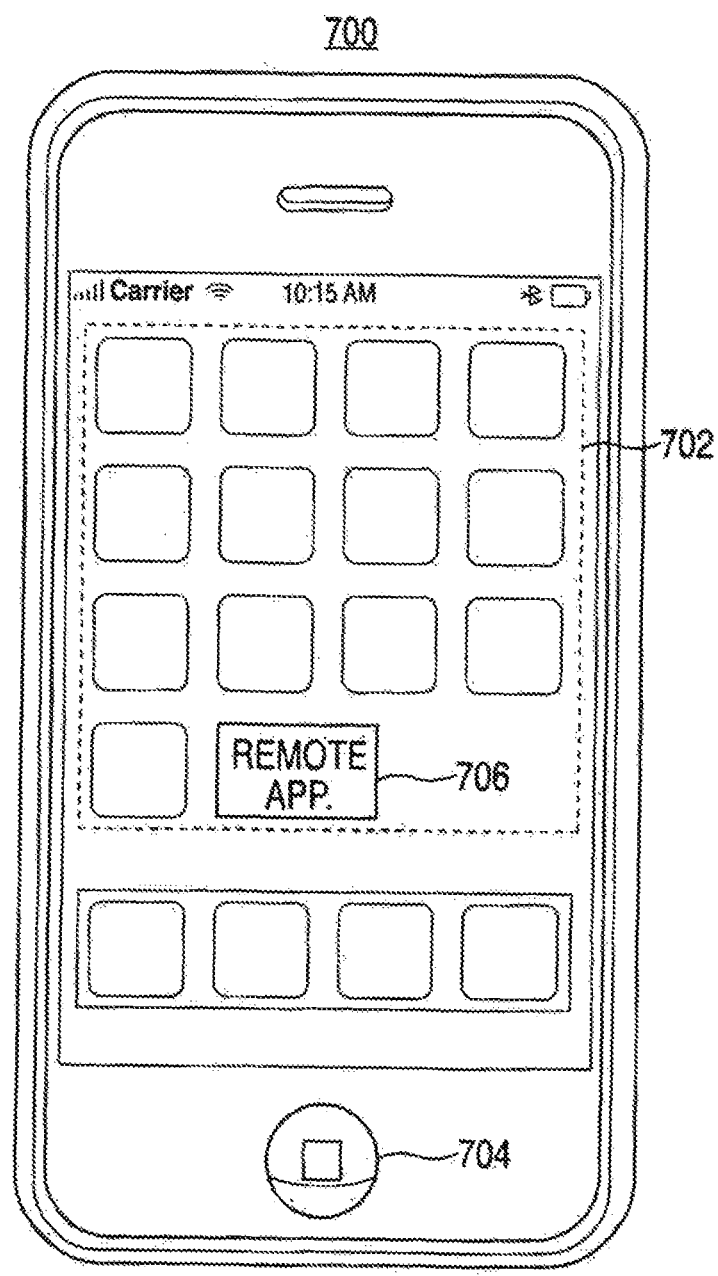
FIG. 7 shows a schematic view of an illustrative display screen of a home screen in accordance with one embodiment of the present invention.

FIG. 7 shows a schematic view of an illustrative display screen of a home screen in accordance with one embodiment of the present invention. Display screen 700 (e.g., a springboard) can include options 702 representing applications that the user may access. The applications can include text, calendar, photos, camera, phone, mail, or any other suitable application that a portable electronic device, such as portable electronic device 300 (FIG. 3), can execute. Display screen 700 can be displayed on the portable electronic device when the portable electronic device is first turned on or when the portable electronic device has exited out of an application that was running. Display screen 700 can also be displayed when a user presses button 704 while the portable electronic device is still running an application.

The portable electronic device can launch a remote control application in one or more ways. For example, the portable electronic device can display an option for the remote control application (in fact, highlight region 706 in FIG. 7 is shown to be highlighting a remote control application). In response to receiving a user instruction to launch the remote control application (e.g., in response to receiving a selection of the remote control application in options 702), the portable electronic device can launch the remote control application. As another example, the remote control application can be launched automatically when a user brings the portable electronic device into the proximity of a multimedia system.

Figure 8:
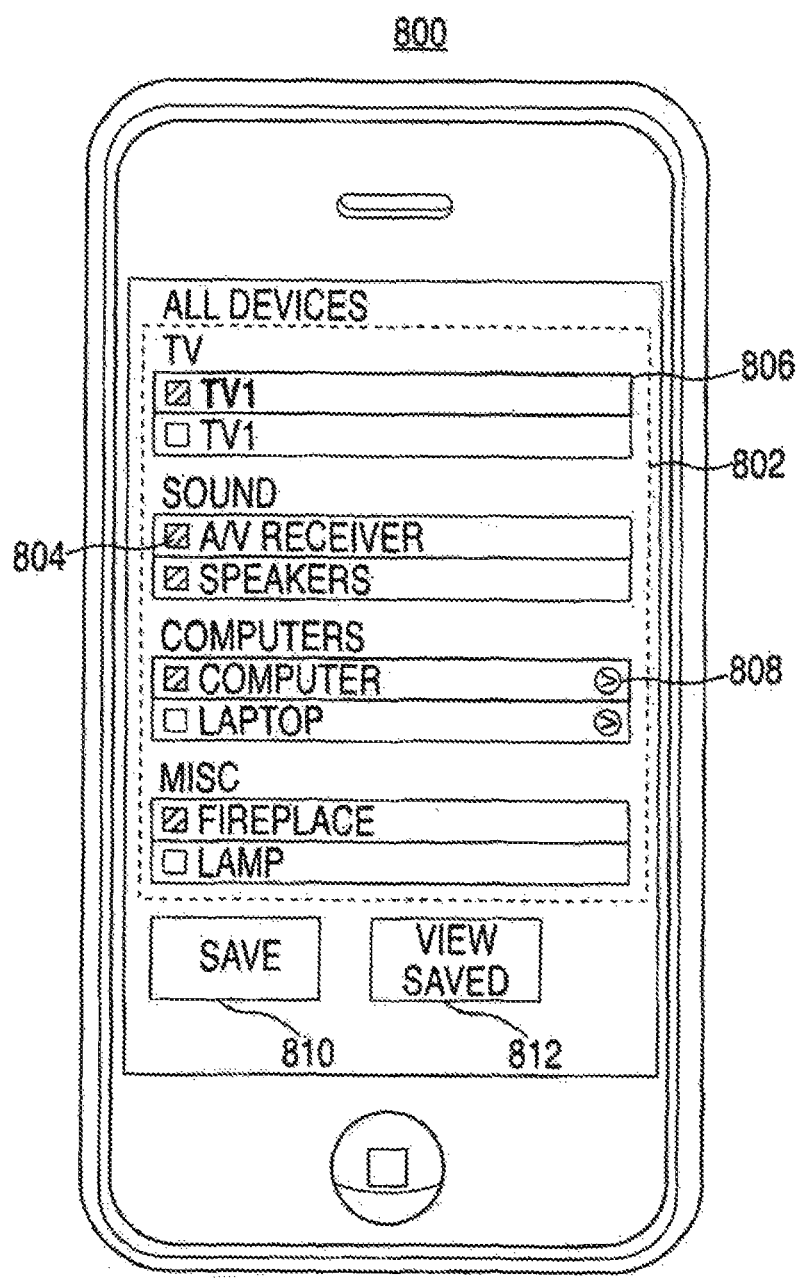
FIG. 8 shows a schematic view of an illustrative display screen for identifying devices that can be controlled in accordance with one embodiment of the present invention.

FIG. 8 shows a schematic view of an illustrative display screen for identifying devices that can be controlled in accordance with one embodiment of the present invention. Display screen 800 can include listings 802, which can identify all the devices that the portable electronic device was able to discover. For example, the portable electronic device can receive information that has been broadcast by devices in the multimedia system.

In some embodiments, servers on each device (e.g., servers 612 and 614 of FIG. 6) can broadcast one or more identifiers that are based on the internet protocol (IP) address of the device. In response to receiving the identifiers, the portable electronic device can establish a communications link with the device. The portable electronic device can establish a communications link by, for example, opening a network socket based on a protocol such as transmission control protocol (TCP), user datagram protocol (UPD), or internet protocol (IP).

Once the portable electronic device discovers the devices, the portable electronic device can receive the states of the software and hardware running on the devices. As a result, the states are "device pushed" to the portable electronic device. Indicators 804 can specify the activity level of a device. For example, a media device can be considered active if it is currently performing a media playback operation. As another example, an appliance (e.g., fireplace or lamp) can be considered active if it is turned on. A user can select a listing 802 by placing highlight region 806 over the listing. In some embodiments, in response to receiving a user selection of a listing, the portable electronic device can display a graphic image based, at least in part, on the controls of a device.

Figure 9:
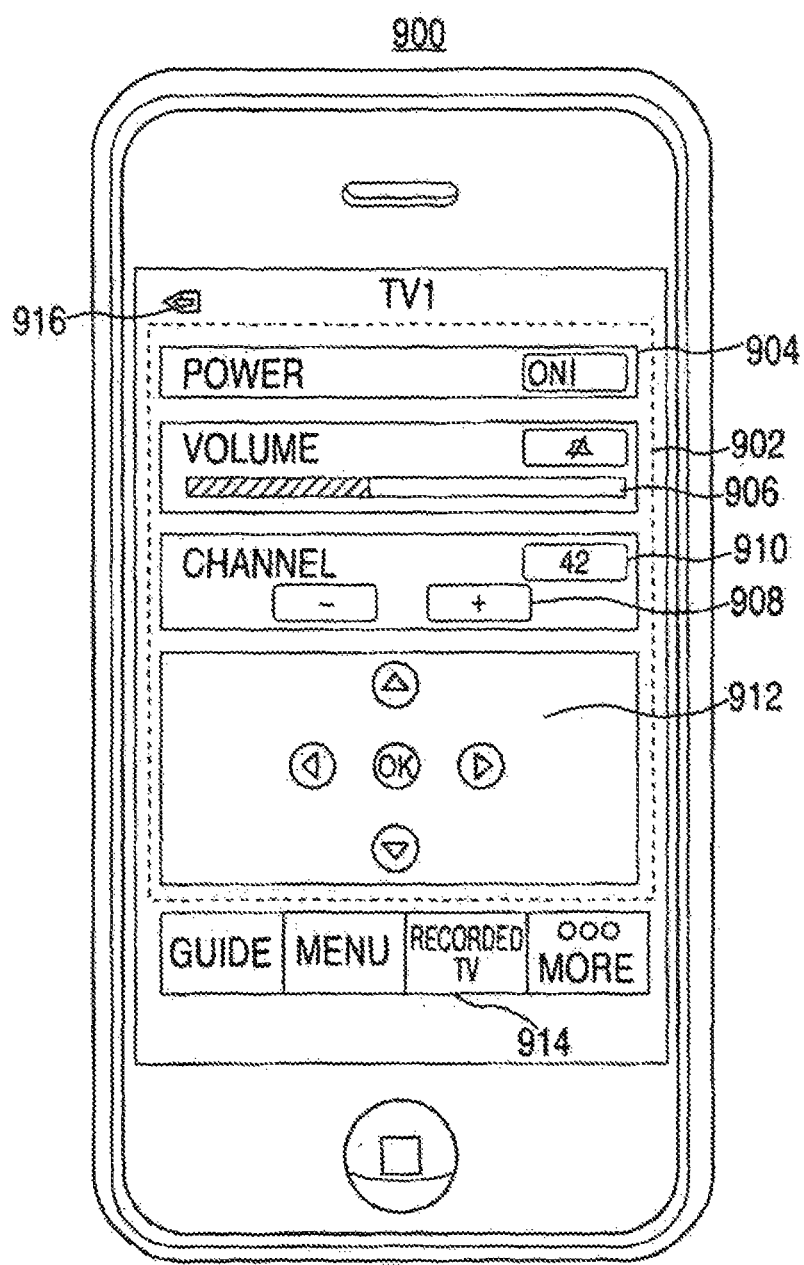
FIG. 9 shows a schematic view of an illustrative display screen for controlling a device in accordance with one embodiment of the present invention.

FIG. 9 shows a schematic view of an illustrative display screen for controlling a device in accordance with one embodiment of the present invention. Display screen 900 can include control options 902, which can allow the user to control the state of the device. Control options 902 can include one or more movable portions that can be displaced by the user. For example, the user may use power control 904 to select to turn on or off the device. As another example, the user may use volume slider 906 to adjust the volume. As yet another example, the user may use channel control 908 to adjust the channel up or down. In addition, the user may use text box 910 to enter a channel directly. For example, in response to the user selecting text box 910, the portable electronic device can display a numeric keypad, which the user may use to enter a new channel.

As still yet another example, display screen 900 can include selectable arrows 912, which can allow the user to navigate menu items on the device. Display screen 900 can also include options 914, which can provide the user with access to more detailed controls for the device (e.g., a media guide, menu, and recorded programs).

Referring back to FIG. 8, display screen 800 can include options 808, which can allow the user to access applications that are hosted on a particular device. In some embodiments, the applications can be displayed in listings 802 under the device that is hosting the applications and above the following device. In some embodiments, the applications can be displayed on a different display screen. In response to the user selecting an option in options 808, the portable electronic device can display the applications.

Figure 10:
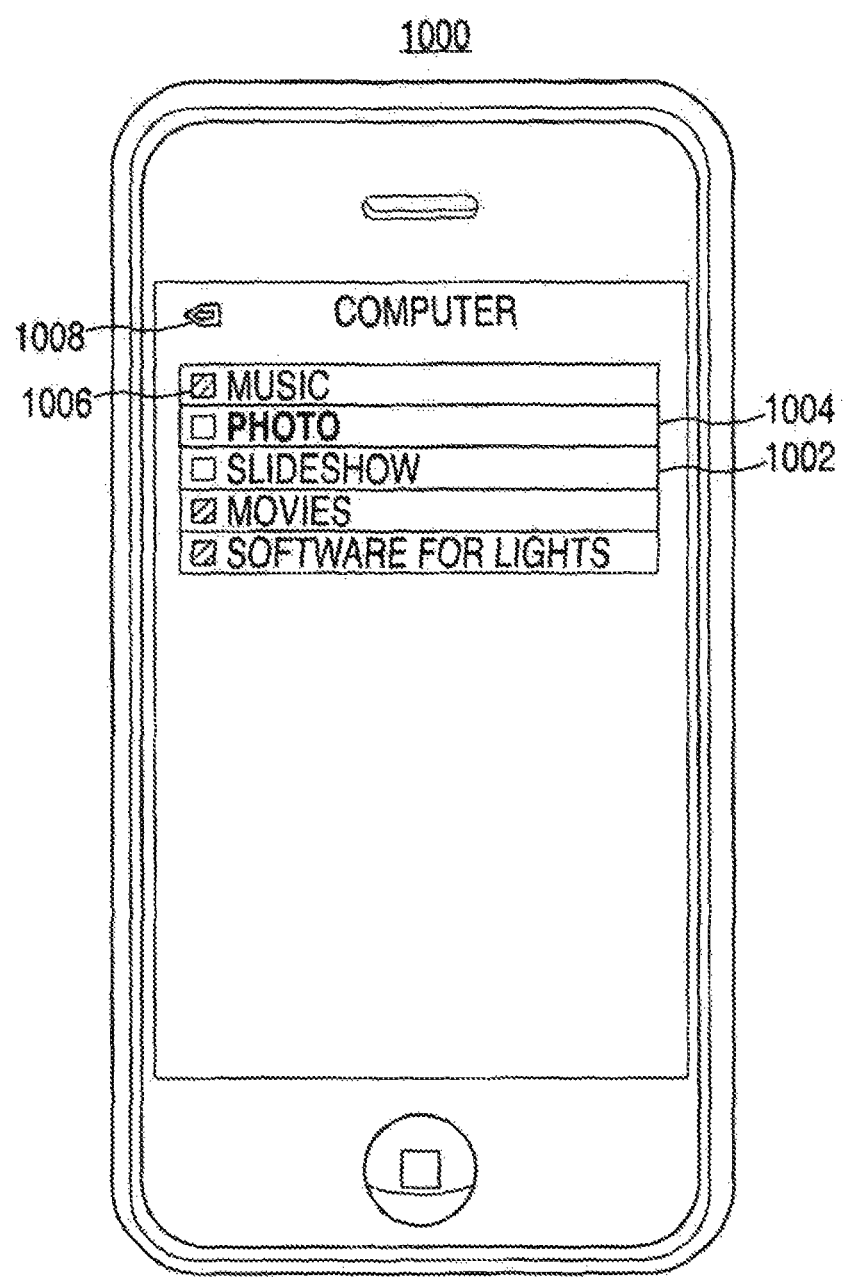
FIG. 10 shows a schematic view of an illustrative display screen for accessing applications hosted on a device in accordance with one embodiment of the present invention.

FIG. 10 shows a schematic view of an illustrative display screen for accessing applications hosted on a device in accordance with one embodiment of the present invention. Display screen 1000 can include listings 1002 for each of the applications on a device. The user may access an application by selecting a listing (e.g., placing highlight region 1004 over a listing). For example, the user may access a "PHOTO" application and use the portable electronic device to browse or edit photos. As another example, the user may access a "SLIDESHOW" application and use the portable electronic device to advance the slides in a presentation. As yet another example, the user may access a "SOFTWARE FOR LIGHTS" application and use the portable electronic device to control the lights.

In some embodiments, display screen 1000 can include indicators 1006, which can specify the activity level of an application. For example, the "MUSIC" application can be considered active if it is playing a song. As another example, the "SOFTWARE FOR LIGHTS" application can be considered active if it is currently controlling the lights in a room.

Referring back to FIG. 8, display screen 800 can include "SAVE" option 810, which can provide the user with an indication that the states of components in the multimedia system can be saved. In some embodiments, the user may select to save the states of components by pressing a button (e.g., button 704 of FIG. 7) on the portable electronic device or selecting "SAVE" option 810.

In some embodiments, in response to the user selecting to save the state, the portable electronic device can automatically save the states of any suitable component in the scene. For example, the portable electronic device can save the states of all components in the scene. As another example, the portable electronic device can save the states of components in a particular location.

The portable electronic device can determine the locations of components in one or more ways. For example, the portable electronic device can determine the locations based on the states broadcast from the components. As another example, the portable electronic device can determine the locations based on the internal map of the components that is stored in memory (e.g., memory 304 of FIG. 3). As yet another example, the portable electronic device can detect the strength of the signals broadcast from the components. The portable electronic device can then determine which components have the strongest signal strength and are therefore in the same location as the portable electronic device. After determining the components that are in a particular location, the portable electronic device can automatically save the states of those components.

In some embodiments, in response to the user selecting "SAVE" option 810 or pressing a button, the portable electronic device can provide the user with an option to save the states of a subset of the components (e.g., devices and applications) in the multimedia system.

Figure 11:
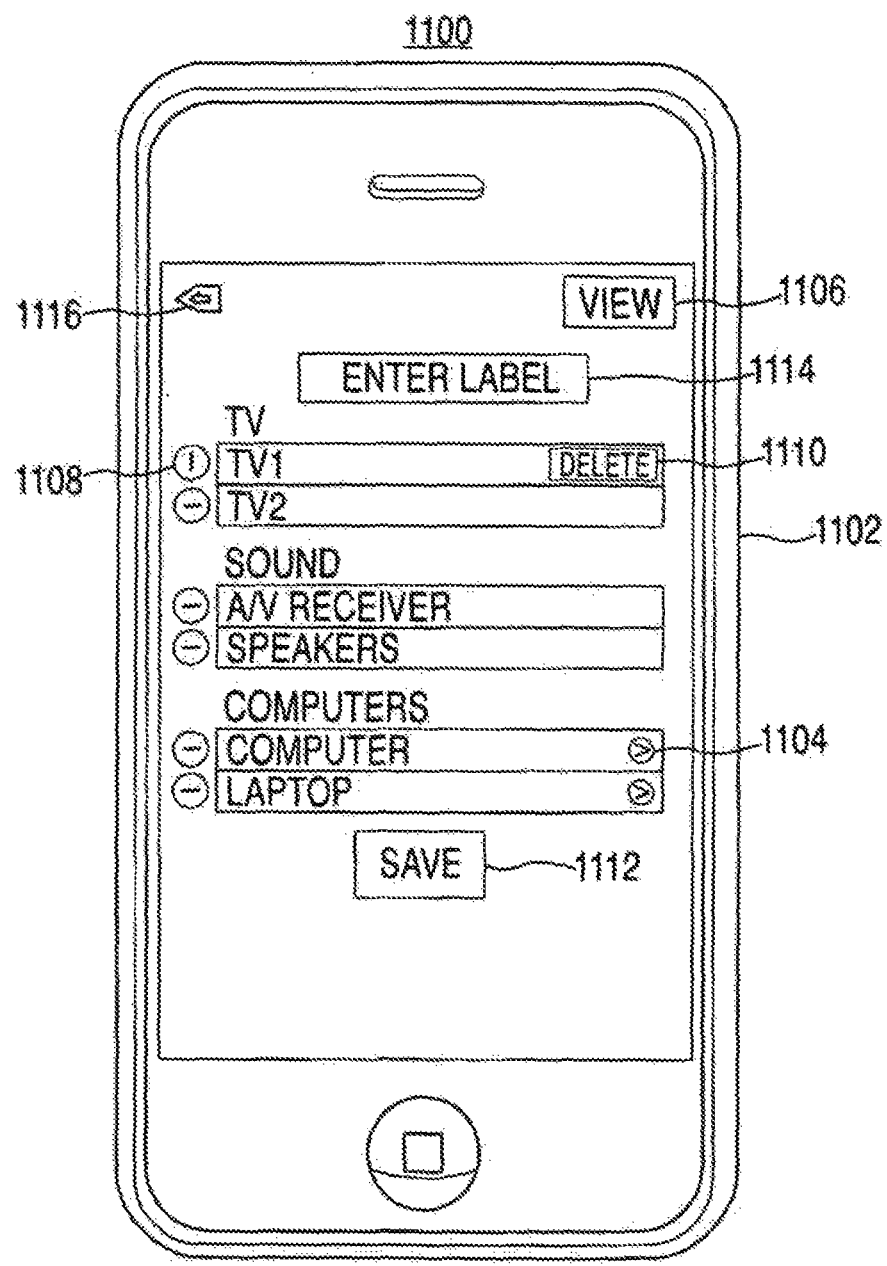
FIG. 11 shows a schematic view of an illustrative display screen for saving a scene in accordance with one embodiment of the present invention.

FIG. 11 shows a schematic view of an illustrative display screen for saving a scene in accordance with one embodiment of the present invention. Display screen 1100 can include listings 1102 of all of the devices in the multimedia system that can be saved in a scene. In some embodiments, the user may select to view applications on a device that can be saved in a scene. For example, in response to the user selecting option 1104 for a "COMPUTER", the portable electronic device can display applications that are hosted on the "COMPUTER".

The devices in listings 1102 can be organized and displayed based on one or more criteria obtained from any suitable source. For example, the criteria can be obtained from information broadcast by servers on the devices (e.g., while discovering the devices or from the states of the devices). As another example, the criteria can be obtained from information that has been specified by the user. The user may, for example, specify that a particular device is located in the living room.

Persons skilled in the art will appreciate that any suitable criteria can be used to organize the devices. For example, as shown in listings 1102, the devices are organized based on the category of each device. Suitable categories can include televisions, sound devices, computers, electronics accessories, gaming systems, appliances, miscellaneous devices, or any other suitable categories. As another example, the devices can be organized based on the devices' names (e.g., the devices can be displayed alphabetically). As yet another example, the devices can be organized based on their locations.

In some embodiments, the user may select to view devices organized based a different criteria. For example, in response to the user selecting "VIEW" option 1106, the portable electronic device can display the devices based on their locations.

Figure 12:
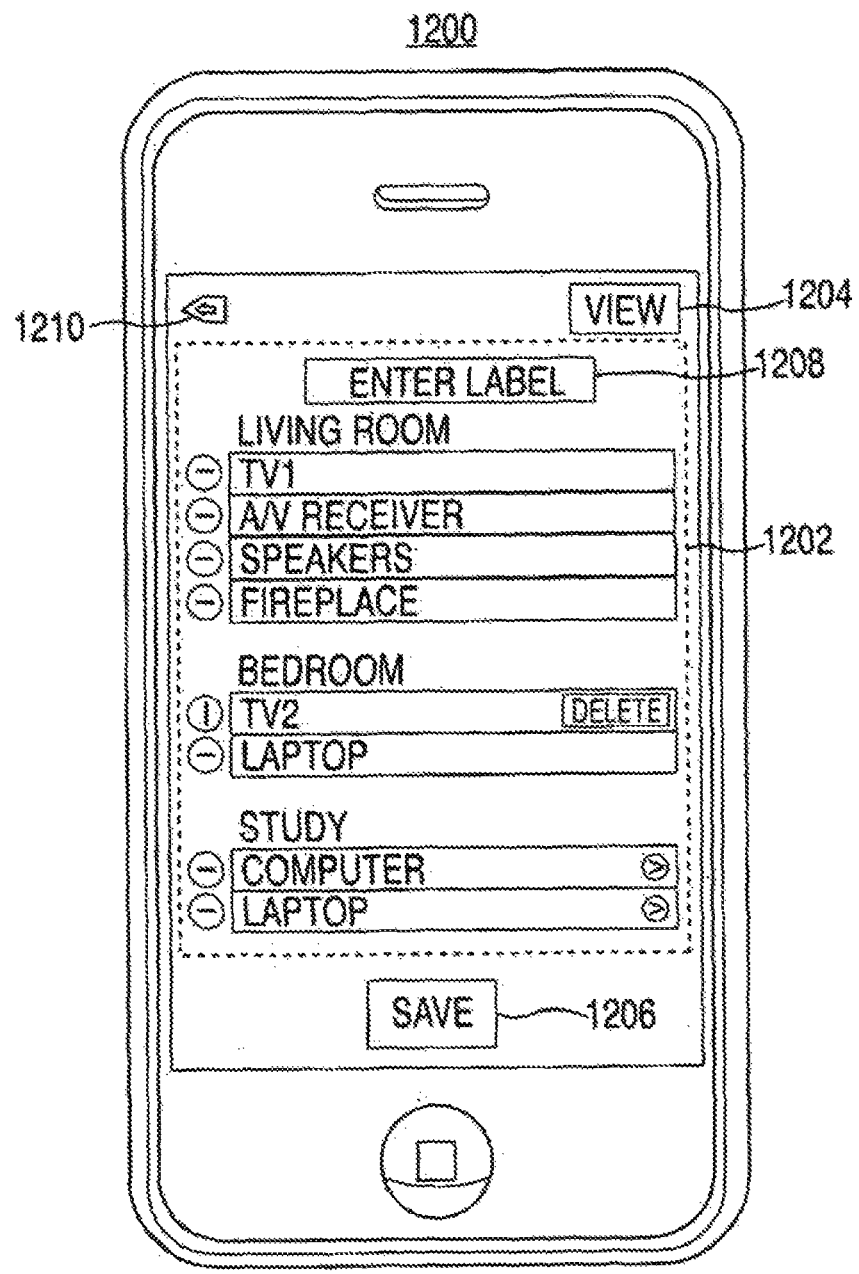
FIG. 12 shows a schematic view of another illustrative display screen for saving a scene in accordance with one embodiment of the present invention.

FIG. 12 shows a schematic view of another illustrative display screen for saving a scene in accordance with one embodiment of the present invention. Display screen 1200 can include listings 1202, which can organize the devices based on their locations. Suitable locations can include, for example, living room, bedroom, study, office, and any other suitable locations of the multimedia system. In some embodiments, if the portable electronic device has or is connected to a large display, the devices can be represented graphically based on their locations. This organization allows the user to easily see the locations of each device. As a result, the user may save a scene that is localized to a particular room.

As discussed previously, locations can be obtained from any suitable source. For example, locations can be broadcast from the components (e.g. locations can be included in the states of the components). As another example, the user may specify the location of a component. As yet another example, the portable electronic device can determine the locations based the strength of the signals broadcast from the components.

In some embodiments, in response to the user selecting "VIEW" option 1204, the portable electronic device can return to displaying the devices based on their categories (e.g., FIG. 11). In some embodiments, if the user continuously selects one or more "VIEW" options (e.g., "VIEW" options 1106 and 1204), the portable electronic device can alternate between displaying display screens 1100 and 1200.

Referring back to FIG. 11, display screen 1100 can include options 1108 associated with the devices in listings 1102. In some embodiments, the user may select a subset of the devices in listings 1102 to include in a particular scene.

For example, when a user selects an option in options 1108, the portable electronic device can animate the option to change its appearance (e.g., a horizontal bar can be changed to a vertical bar). In some embodiments, in response to the user selecting option 1108, "DELETE" option 1110 can be displayed. "DELETE" option 1110 can include, for example, text, a graphic image, or any combination thereof. In some embodiments, in response to the user selecting option 1104, the portable electronic device can provide delete options for applications that are hosted on a device. The user may then select one or more applications to delete from the scene.

In some embodiments, in response to the user selecting "DELETE" option 1110 for a device (e.g., "TV1"), the portable electronic device can remove the device from the scene and display the devices that are still included in the scene.

Figure 13:
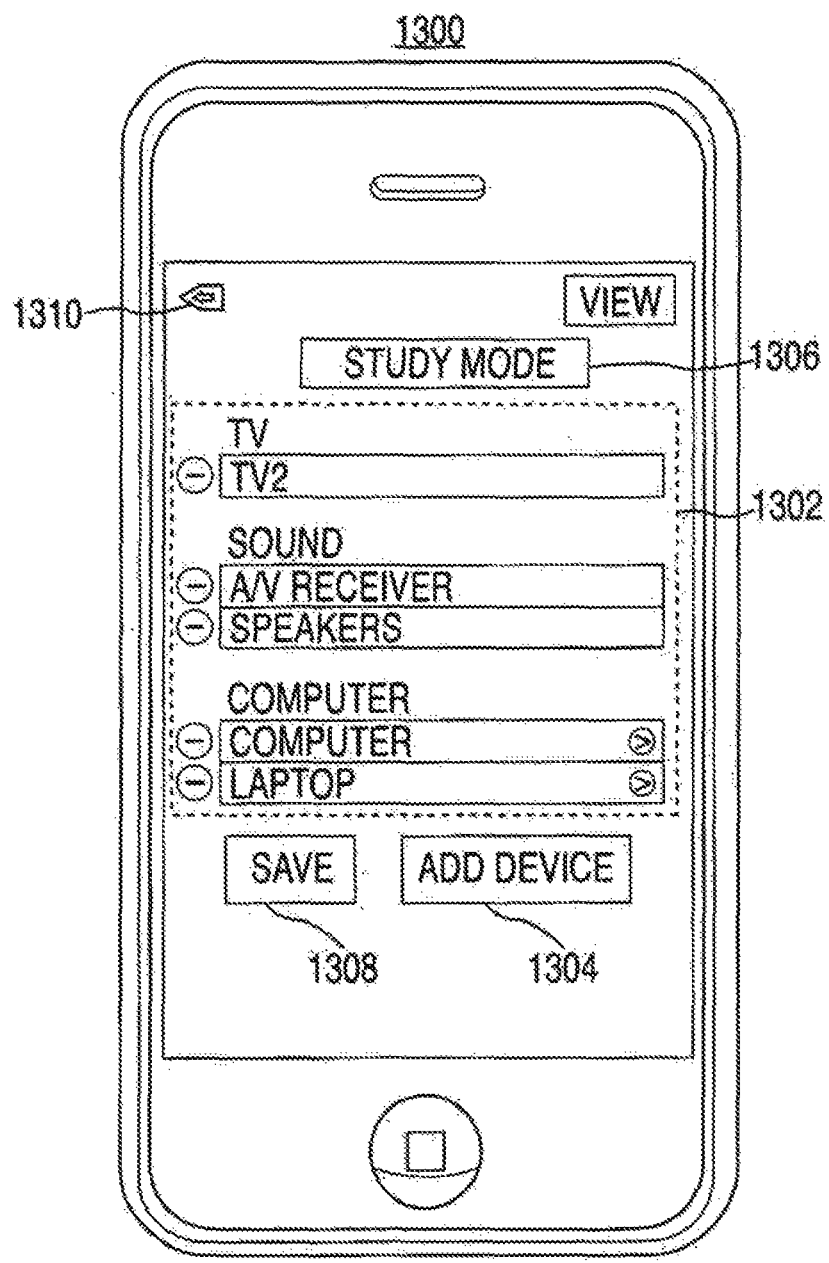
FIG. 13 shows a schematic view of yet another illustrative display screen for saving a scene in accordance with one embodiment of the present invention.

FIG. 13 shows a schematic view of yet another illustrative display screen for saving a scene in accordance with one embodiment of the present invention. Display screen 1300 can include listings 1302 of devices that the user has selected to include in the scene. For example, "TV1" has been deleted from the scene and does not appear in listings 1302.

In some embodiments, display screen 1300 can include "ADD DEVICE" option 1304, which can provide the user with components that have not been included in the scene but can be controlled by the portable electronic device. For example, the components may have previously been deleted from the scene, or the components may have recently been added to the multimedia system. In response to the user selecting "ADD DEVICE" option 1304, the portable electronic device can display those components that have not been included in the scene.

Figure 14:
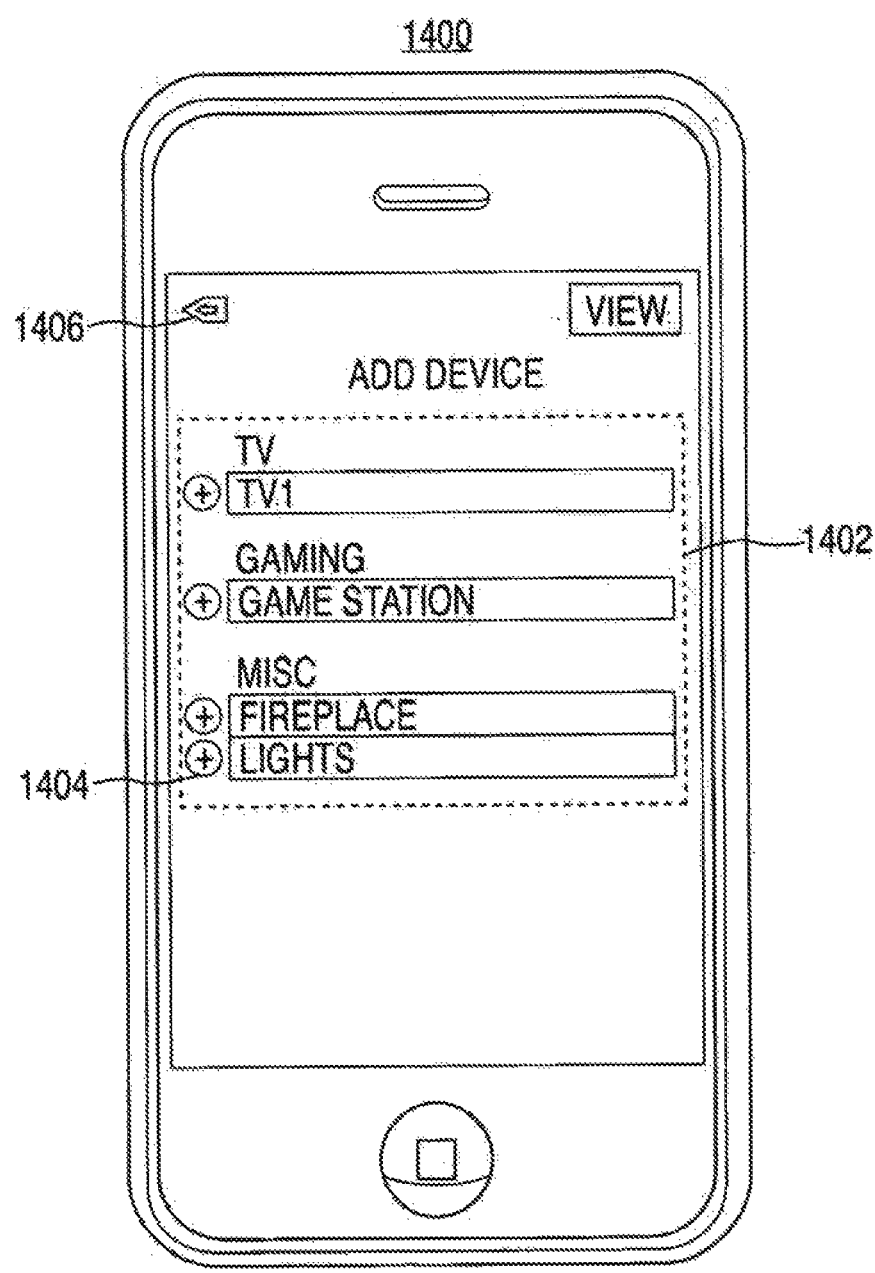
FIG. 14 shows a schematic view of an illustrative display screen for adding devices to a scene in accordance with one embodiment of the present invention.

FIG. 14 shows a schematic view of an illustrative display screen for adding devices to a scene in accordance with one embodiment of the present invention. Display screen 1400 can include listings 1402 of devices in the multimedia system that are not included in the scene. In some embodiments, the user may add devices to the scene by selecting option 1404. In some embodiments, once the user selects to add a device, the portable electronic device can remove the device from listings 1402 and add the device to the scene. Once the user has finished adding devices to the scene, the user may select "BACK" option 1406 to return to display screen 1300 (FIG. 13).

Referring back to FIG. 13, display screen 1300 can include text box 1306, which can allow the user to assign a label to the scene. In some embodiments, the user may use the label to identify the scene. For example, when the user selects text box 1306, the portable electronic device can display an alphanumeric keypad for the user to enter a label for the scene. The user may use the alphanumeric keypad to label the scene as "STUDY MODE." The user may select to save the scene on the portable electronic device by selecting "SAVE" option 1308 or by pressing a button (e.g., button 704 of FIG. 7). In some embodiments, "SAVE" option 1308 can be un-selectable (e.g., grayed out or invisible) until the user enters a label for the scene. In response to the user selecting "SAVE" option 1308, the portable electronic device can save the components (e.g., devices and applications) and their current states in memory (e.g., memory 304 of FIG. 3). The portable electronic device can then provide a summary of the saved scene to the user.

Figure 15:
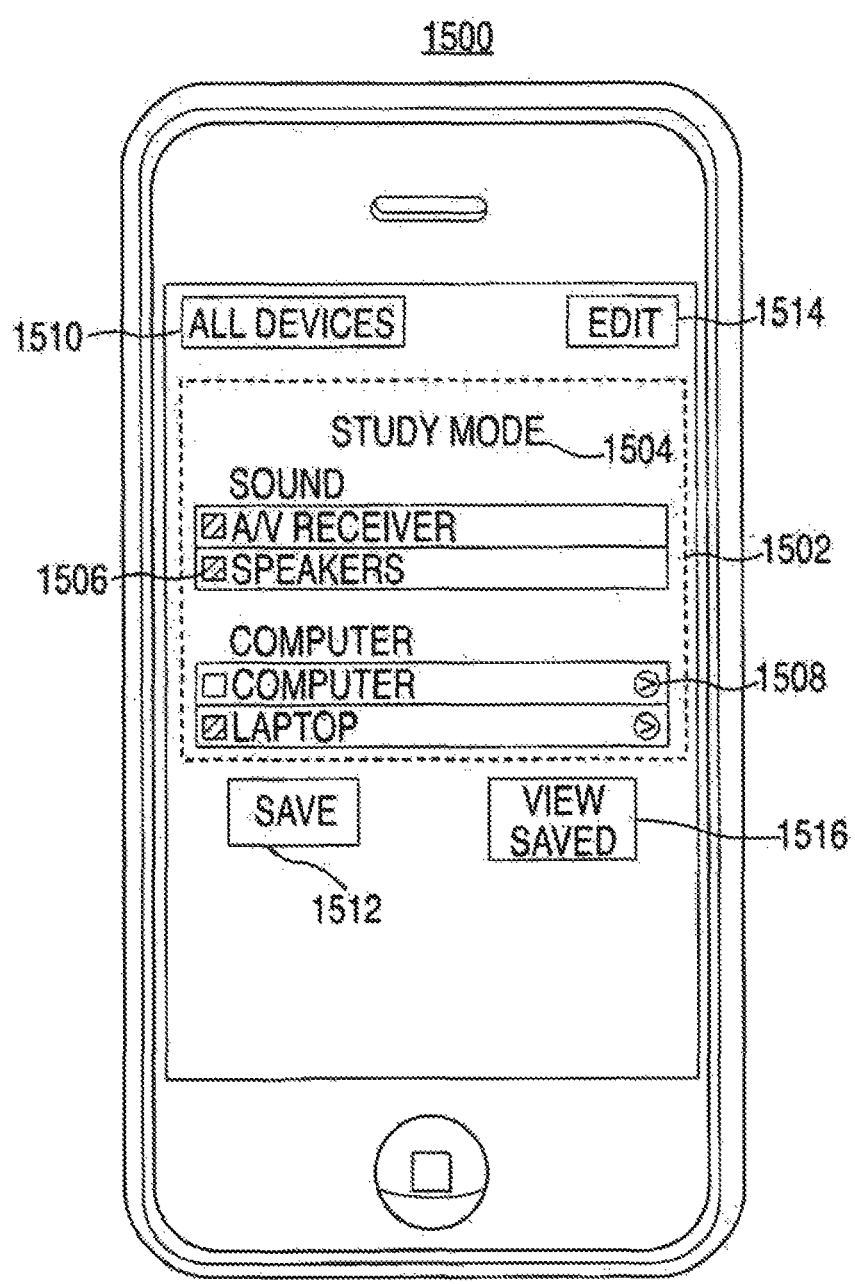
FIG. 15 shows a schematic view of an illustrative display screen for providing a summary of a saved scene in accordance with one embodiment of the present invention.

FIG. 15 shows a schematic view of an illustrative display screen for providing a summary of a saved scene in accordance with one embodiment of the present invention. Display screen 1500 can include listings 1502, which can provide the user with devices that can be controlled in the saved scene. Label 1504 can identify the saved scene. In some embodiments, indicators 1506 can specify the activity level of each device. In addition, the user may select option 1508 to control the applications that are hosted on a device.

In some embodiments, display screen 1500 can include "ALL DEVICES" option 1510, which can allow the user to view all the devices in the multimedia system that can be controlled. In some embodiments, in response to the user selecting "ALL DEVICES" option 1510, display screen 800 (FIG. 8) can be displayed.

In some embodiments, the user may save updates to the scene by selecting "SAVE" option 1512. In response to the user selecting "SAVE" option 1512, the portable electronic device can save any changes to the states of the components since the scene was last saved. For example, the user may have changed the volume setting on the speakers or the application that is running on the computer.

Figure 19:
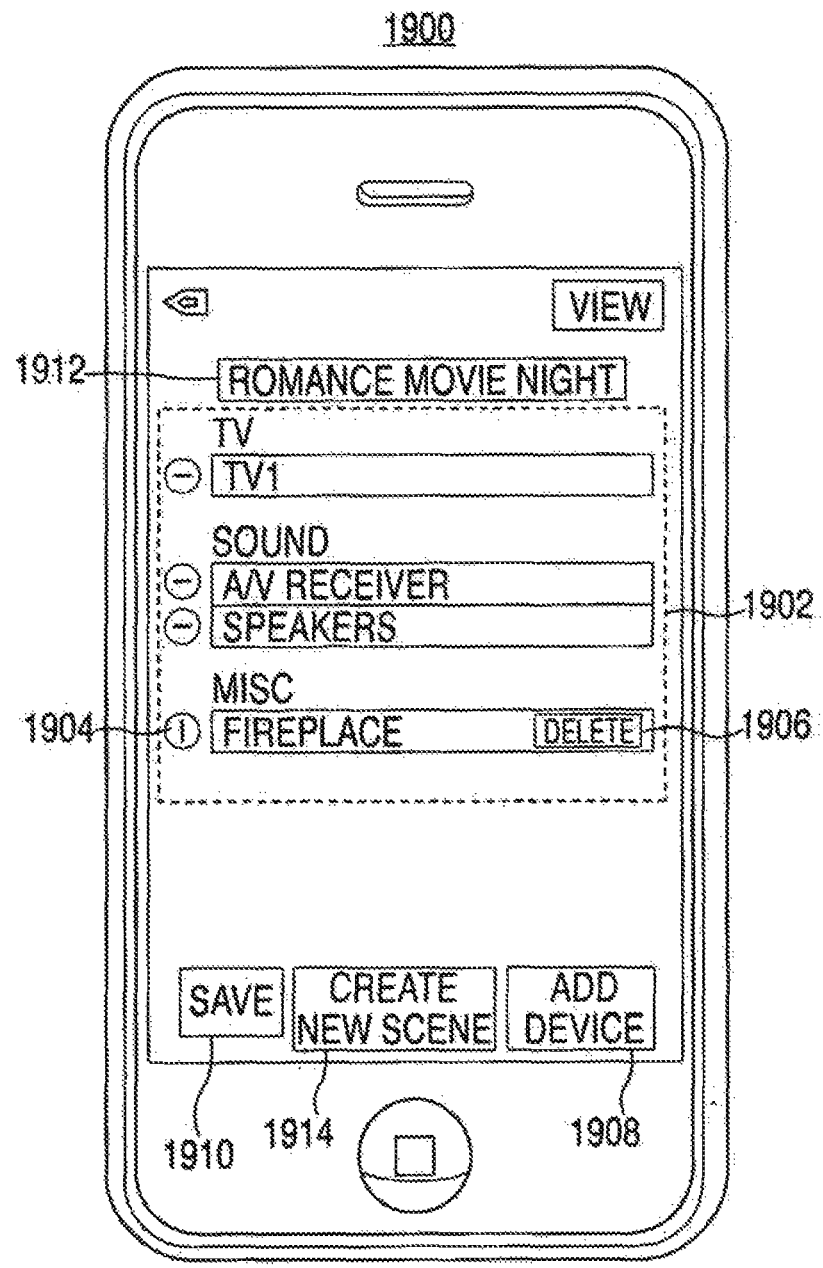
FIG. 19 shows a schematic view of an illustrative display screen for editing a restored scene in accordance with one embodiment of the present invention.

In some embodiments, the user may change the components that are included in the scene by selecting "EDIT" option 1514. In response to the user selecting "EDIT" option 1514, the portable electronic device can provide a display screen similar to display screen 1900 (FIG. 19). The user may then select to delete components from the scene, add other available components to the scene, or any combination thereof.

In some embodiments, the portable electronic device can allow the user to set up a scene in which the states of components change with time. For example, for a "DINNER" scene, the user may specify that the music gets softer as it gets later in the evening. As another example, for a "BABYSITTING" scene, the user may specify that the volume on the television decreases as it gets later in the evening. At a given time in the night, the television can turn off.

In some embodiments, the user may set up the scene so that the scene is automatically restored at a certain time of the day. A scene can be linked to an alarm on the portable electronic device or on any suitable component in the multimedia system. For example, a "WAKE-UP" scene can be set up to turn on the lights, the media player, and the coffee pot at 8 am.

Figure 16:
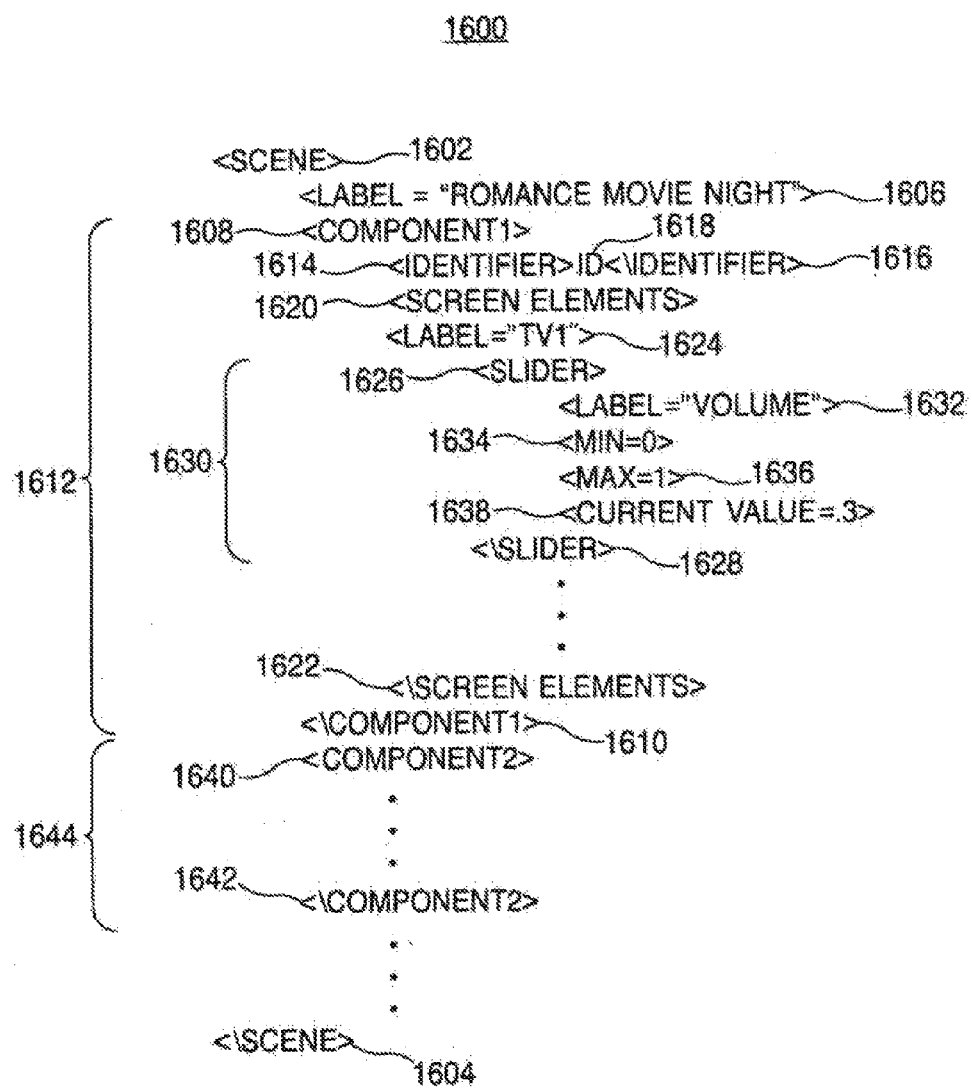
FIG. 16 shows illustrative XML code that can be used to save a scene in accordance with one embodiment of the present invention.

FIG. 16 shows illustrative XML code that can be used to save a scene in accordance with one embodiment of the present invention. A scene can be saved as a preference file on the portable electronic device. In some embodiments, the preference file can be in a markup language format. Suitable markup languages can include hypertext markup language (HTML), extensible markup language (XML), or any other variation of markup languages. The use of markup language can allow the preference file to be handled by a wide variety of components. Persons skilled in the art will appreciate that XML file 1600 is merely illustrative and that a scene can be saved in any suitable format.

XML file 1600 can include scene tag 1602 and corresponding close scene tag 1604, which can define the beginning and end of a scene. Label tag 1606 can define a label for the scene. For example, label tag 1606 can be used by the portable electronic device to display onscreen text that identifies a scene as "ROMANCE MOVIE NIGHT."

Component tags 1608 and 1610 can be used to define the beginning and end of the saved state of component 1612 ("COMPONENT1"). Identifier tags 1614 and 1616 and ID 1618 can be used by the portable electronic device to associate other information (e.g., information stored in memory 304 of FIG. 3) with the component. For example, the portable electronic device can use ID 1618 to find one or more criteria for organizing components in a listing (e.g., listings 1102 of FIG. 11). The portable electronic device can, for example, discover that "COMPONENT1" is a television and is located in the living room. As another example, the portable electronic device can use ID 1618 to find an interface template for displaying the controls of the component. The portable electronic device can, for example, use ID 1618 to determine if the controls can be displayed in a customized configuration or a generic configuration.

Screen elements tag 1620 and corresponding close screen elements tag 1622 can define the beginning and end of a screen elements section for component 1612. A screen element can be passive (e.g., an element that can provide information about the current state of the component) or active (e.g., an element that can display information and/or can be controlled based on user input). Label tag 1624 can define a label for the component. For example, the portable electronic device can use label tag 1624 to display on-screen text that identifies a component as "TV1."

Slider tags 1626 and 1628 can define the beginning and end of slider element 1630. Slider element 1630 can be a passive or active screen element and can represent a volume slider such as, for example, volume slider 906 of FIG. 9. Label tag 1632 can specify a label for slider element 1630. For example, the portable electronic device can use label tag 1632 to display on-screen text that identifies slider element 1630 as a "volume" control.

Min tag 1634 can define the lowest value for slider element 1630. Similarly, max tag 1636 can define the highest value for slider element 1630. Current value tag 1638 can define the current value of slider element 1630. In addition, slider element 1630 can be displayed in various ways depending on the display capabilities of the portable electronic device.

Component tags 1640 and 1642 can be used to define the beginning and end of the saved state of component 1644 ("COMPONENT2"). Component 1644 can be another component (e.g., A/V receiver) that is included in the scene.

Figure 17:
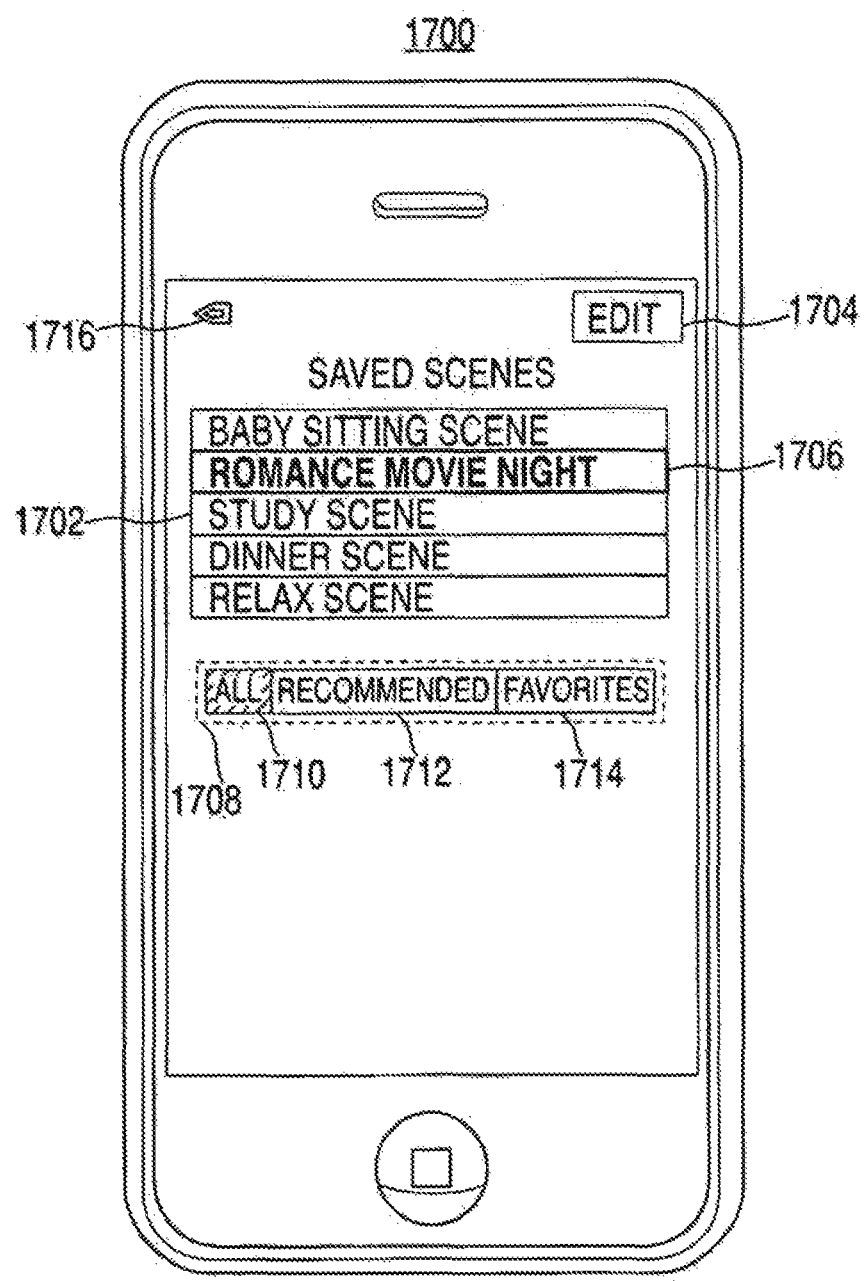
FIG. 17 shows a schematic view of an illustrative display screen for providing saved scenes in accordance with one embodiment of the present invention.

FIG. 17 shows a schematic view of an illustrative display screen for providing saved scenes in accordance with one embodiment of the present invention. Display screen 1700 can be displayed using any suitable approach, including, for example, in response to the user selecting a "VIEW SAVED" option (e. g., "VIEW SAVED" option 812 of FIG. 8 or "VIEW SAVED" option 1516 of FIG. 15). Display screen 1700 can include listings 1702 of scenes that have been previously saved by the user (e.g., identified from the preference files saved on the portable electronic device). In some embodiments, listings 1702 can be arranged alphabetically.

In some embodiments, the portable electronic device can keep track of usage patterns of the saved scenes (e.g., the times and frequencies that the saved scenes are accessed by the user). This information can be stored in memory (e.g., memory 304 of FIG. 3). In some embodiments, listings 1702 can be arranged based on the frequency of access (e.g., the most frequently accessed scene appears first in listings 1702). In some embodiments, listings 1702 can be arranged based on when a scene was last accessed (e.g., the last accessed scene appears first in listings 1702).

Display screen 1700 can include "EDIT" option 1704, which can allow the user to edit listings 1702. In some embodiments, in response to the user selecting "EDIT" option 1704, the portable electronic device can allow the user to delete one or more saved scenes.

In some embodiments, the portable electronic device can provide an option to the user to restore a saved scene. For example, the user may select to restore a saved scene by placing highlight region 1706 over a listing in listings 1702. In response to the user selecting to restore a scene, the portable electronic device can inspect the preference file of the scene, and can find the components that are listed in the preference file. The portable electronic device can then attempt to contact these components and verify whether the components are currently available. For example, the portable electronic device can verify if the servers on the components are broadcasting identifiers.

If the portable electronic device discovers that a component is available, the portable electronic device can obtain the saved state of the component from the preference file, and transmit the saved state to the component (e.g., via remote client 616 of FIG. 6). In some embodiments, a server on a device (e.g., server 612 or server 614 of FIG. 6) can receive the saved state and restore the state of the device. In some embodiments, a plug-in on the device (e.g., plug-in 620 of FIG. 6) can obtain the saved state from the server and restore the state of an application. If the portable electronic device discovers that a component is not available (e.g., the component may have been removed from the multimedia system), the portable electronic device can skip the component in the transmissions, suggest alternatives to the user (e.g., using an alternative set of speakers or lights), or perform any other suitable operation.

If the portable electronic device determines that a component's current state is the same as the saved state, the portable electronic device may not transmit the saved state to the component. As a result, the restoring process can be faster and more efficient. After restoring the scene, the portable electronic device can provide a summary of the restored scene.

Figure 18:
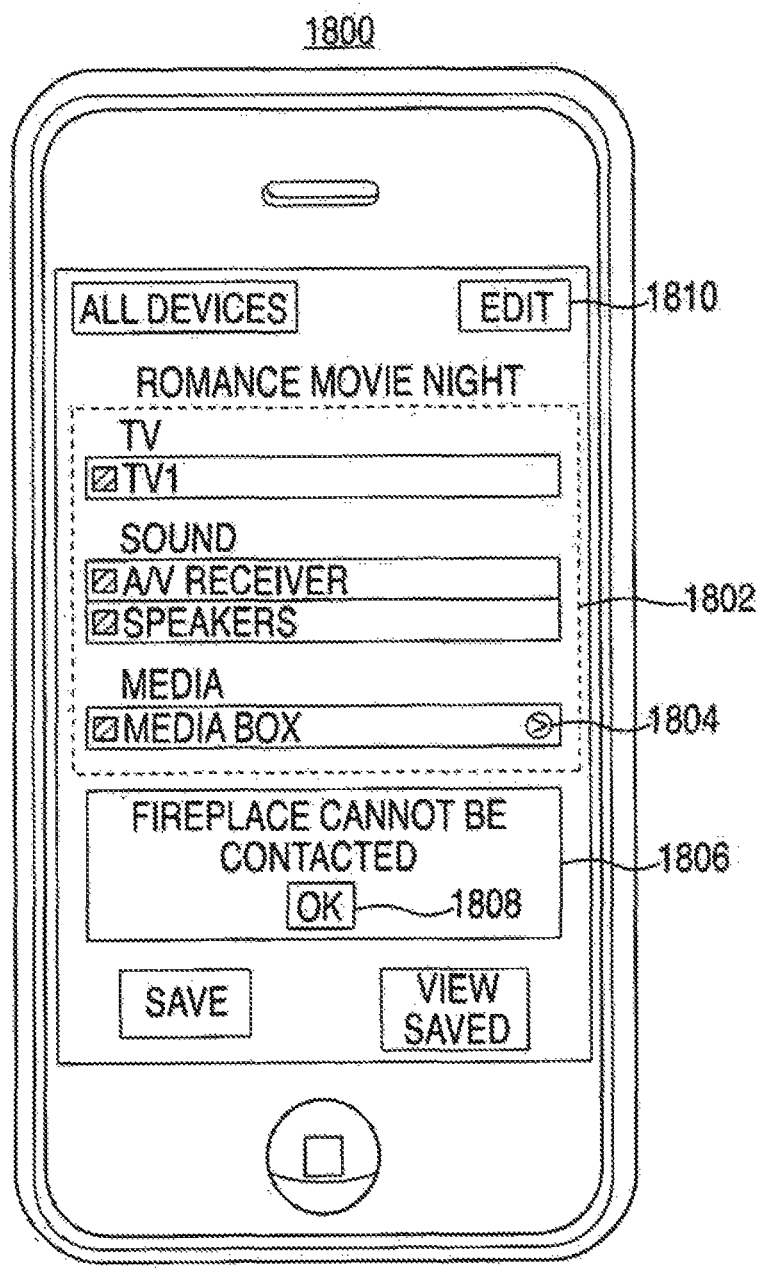
FIG. 18 shows a schematic view of an illustrative display screen for providing a summary of a restored scene in accordance with one embodiment of the present invention.

FIG. 18 shows a schematic view of an illustrative display screen for providing a summary of a restored scene in accordance with one embodiment of the present invention. Display screen 1800 can include listings 1802, which can provide the user with devices that can be controlled in the restored scene. For example, TV, sound, media, and miscellaneous devices are included in the "ROMANCE MOVIE NIGHT" scene. In some embodiments, the user may select option 1804 to control the applications that are hosted on a device.

If a particular component of the restored scene is not available, the portable electronic device can display message alert 1806 that indicates that the component can not be contacted. For example, if the portable electronic device is unable to establish communications with the fireplace, a "cannot be contacted" message can be displayed. The user may close message alert 1806 by selecting "OK" option 1808.

In some embodiments, the portable electronic device can recommend alternative components to substitute for the component that is no longer available. For example, the portable electronic device can recommend another state for an existing component in the scene. As another example, the portable electronic device can recommend a new component that is not included in the scene. In addition, the portable electronic device can recommend a state for the new component that closely matches the component that is no longer available.

In some embodiments, display screen 1800 can include "EDIT" option 1810, which can allow the user to edit the restored scene. For example, in response to the user selecting "EDIT" option 1810, the portable electronic device can allow the user to add other available components to the scene, delete components from the scene, or any combination thereof.

FIG. 19 shows a schematic view of an illustrative display screen for editing a restored scene in accordance with one embodiment of the present invention. Display screen 1900 can include listings 1902 of a listing of devices that are included in the scene. In some embodiments, the user may select to delete a device by selecting option 1904. Similar to option 1108, option 1904 can be animated in response to user selection. In some embodiments, in response to the user selecting option 1904, "DELETE" option 1906 can be displayed. "DELETE" option 1906 can include text, a graphic image, or any combination thereof. In some embodiments, in response to the user selecting "DELETE" option 1906 for a device, the portable electronic device can delete the device from the scene. For example, the user may delete "FIREPLACE" from listings 1902.

In some embodiments, the user may add other available devices to listings 1902 by selecting "ADD DEVICE" option 1908. In response to the user selecting "ADD DEVICE" option 1908, the portable electronic device can search for other devices that can be controlled but are not included in listings 1902. The portable electronic device can present a display screen similar to display screen 1400 of FIG. 14. Using the options (e.g., option 1404) of FIG. 14, described above, the user may add one or more devices to listings 1902. The user may then select "SAVE" option 1910 to save the edited scene.

In some embodiments, the portable electronic device can provide an option for the user to create a new scene from the restored scene. For example, the user may assign a new label to the restored scene by entering a new label in text box 1912. In response to the user selecting to create a new scene (e.g., by selecting "CREATE NEW SCENE" option 1914), the portable electronic device can create a copy of the restored scene, and associate the copied scene with the new label.

Referring back to FIG. 17, display screen 1700 can include options 1708 for changing the saved scenes that are displayed. For example, the portable electronic device can shade "ALL" option 1710 to indicate that all saved scenes are currently displayed in listings 1702. In some embodiments, in response to the user selecting "RECOMMENDED" option 1712, the portable electronic device can provide recommended scenes that are determined to be suitable based on one or more parameters.

Figure 20:
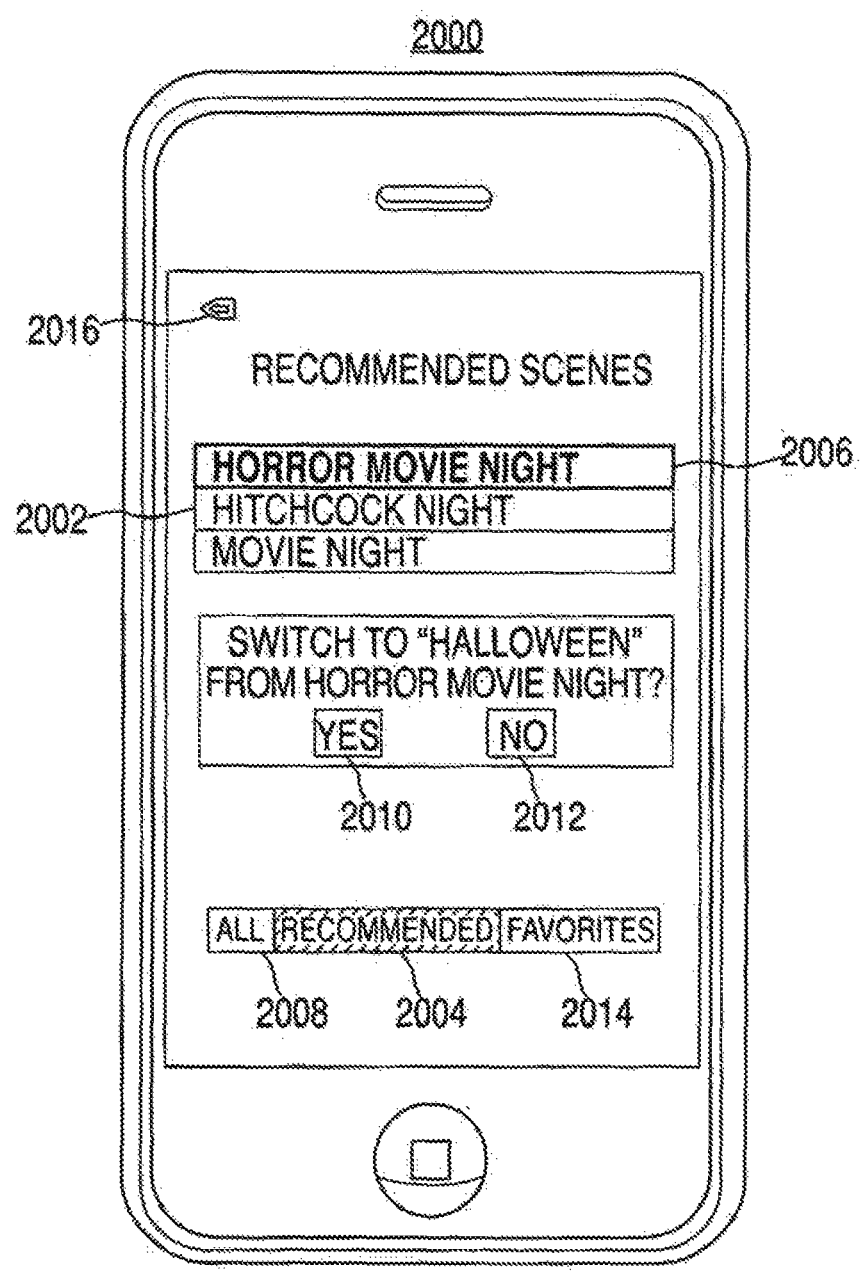
FIG. 20 shows a schematic view of an illustrative display screen for providing recommended scenes in accordance with one embodiment of the present invention.

FIG. 20 shows a schematic view of an illustrative display screen for providing recommended scenes in accordance with one embodiment of the present invention. Display screen 2000 can include listings 2002 of recommended scenes determined to be suitable based on one or more parameters. In some embodiments, "RECOMMENDED" option 2004 can be shaded to indicate that listings 2002 include recommended scenes. In some embodiments, the portable electronic device can suggest the recommended scenes by comparing the states of components in the current scene with states of components in the saved scenes. Suitable states can include attributes of the media that is playing on a component, states of lights, states of miscellaneous components (e.g., fireplace), and any other suitable states.

In some embodiments, the portable electronic device can search for metadata associated with the media that is playing on a component in the current scene. For example, the user may currently be watching a movie on "TV1." The portable electronic device can determine the genre of the movie (e.g., horror movie) and can search for one or more saved scenes in which "TV1" is playing another movie from the same genre. As another example, the portable electronic device can determine the artist of a song that is playing on a "MUSIC" application, and can search for one or more saved scenes in which the "MUSIC" application is playing another song by the same artist. As yet another example, the portable electronic device can determine that the user is watching an episode from a television show on ITV2" and can search for a saved scene in which "TV2" is playing another episode from the same television show.

In some embodiments, the portable electronic device can determine that the user is watching an episode from a television show on "TV1" and can search for a saved scene in which "TV2" is playing an episode from the same television show. In response to finding a saved scene in which "TV2" is playing the same television show, the portable electronic device can identify the locations of "TV1" and "TV2" (e.g., by using an internal map). For example, the portable electronic device may find that "TV1" is located in the bedroom and "TV2" is located in the living room. When the user selects to restore the scene, the portable electronic device can attempt to apply the states of devices in the scene to similar devices around "TV1". For example, the television volume and lights in the bedroom can be adjusted to a similar state to the television volume and lights in the living room.

In some embodiments, the user may select to restore a recommended scene in listings 2002 by placing highlight region 2006 over a listing. In response to the user selecting to restore a recommended scene, the portable electronic device can restore the states of components from the recommended scene.

In some embodiments, the portable electronic device can provide one or more options that allow the user to select to continue playing the current media or switch to playing media from the recommended scene. For example, the portable electronic device can display "YES" option 2010 and "NO" option 2012. In response to the user selecting "YES" option 2010, the portable electronic device can begin to play media from the recommended scene. In response to the user selecting "NO" option 2012, the portable electronic device can continue to play the current media so that the user's viewing experience is not disrupted.

Since the user may not want to be bothered while watching media, the portable electronic device can display "YES" option 2010 and "NO" option 2012 at any suitable time. For example, if the user is watching a television program, the portable electronic device can wait for a commercial break before displaying the options (e.g., the commercial break can be identified using media cues). As another example, if the user is listening to music, the portable electronic device can wait until there is a break in the music (e.g., the time between songs) before displaying the options. As yet another example, the portable electronic device can immediately display the options after the user selects to restore a recommended scene. After displaying the options, the portable electronic device can wait for a user selection. The user may not enter a selection if he prefers to continue watching the current media. Therefore, if no user selection is received after a period of time, the portable electronic device can remove the options from display screen 2000 and continue to play the current media. As still yet another example, the user may set up the portable electronic device so that a recommended scene is automatically restored when the user selects the recommended scene. During setup, the user may also specify whether to switch the current media to the media in the recommended scene.

As discussed previously, the portable electronic device can keep track of usage patterns of the saved scenes. In some embodiments, the portable electronic device can recommend scenes based on the usage patterns. For example, the portable electronic device can determine that the current date is February 14th. Based on this information, the portable electronic device can search for a saved scene that was saved and/or restored on the same day for the past several years. As another example, the portable electronic device can determine that the current day of the week is Saturday, and can search for a saved scene that is accessed the most on Saturdays. As yet another example, the portable electronic device can use day parting to recommend a saved scene. Any suitable way of diving the day can be used such as, for example, dividing the day into 8 am-10 am, 10 am-4 pm, 5 pm-6 pm, and bpm-10 pm time slots. As a result, if the portable electronic device determines that the current time is 9 am, the portable electronic device can search for a saved scene that is accessed the most between Sam and 10 am. Persons skilled in the art will appreciate that any suitable criteria and/or combinations of criteria can be used to determine recommended scenes.

Figure 21:
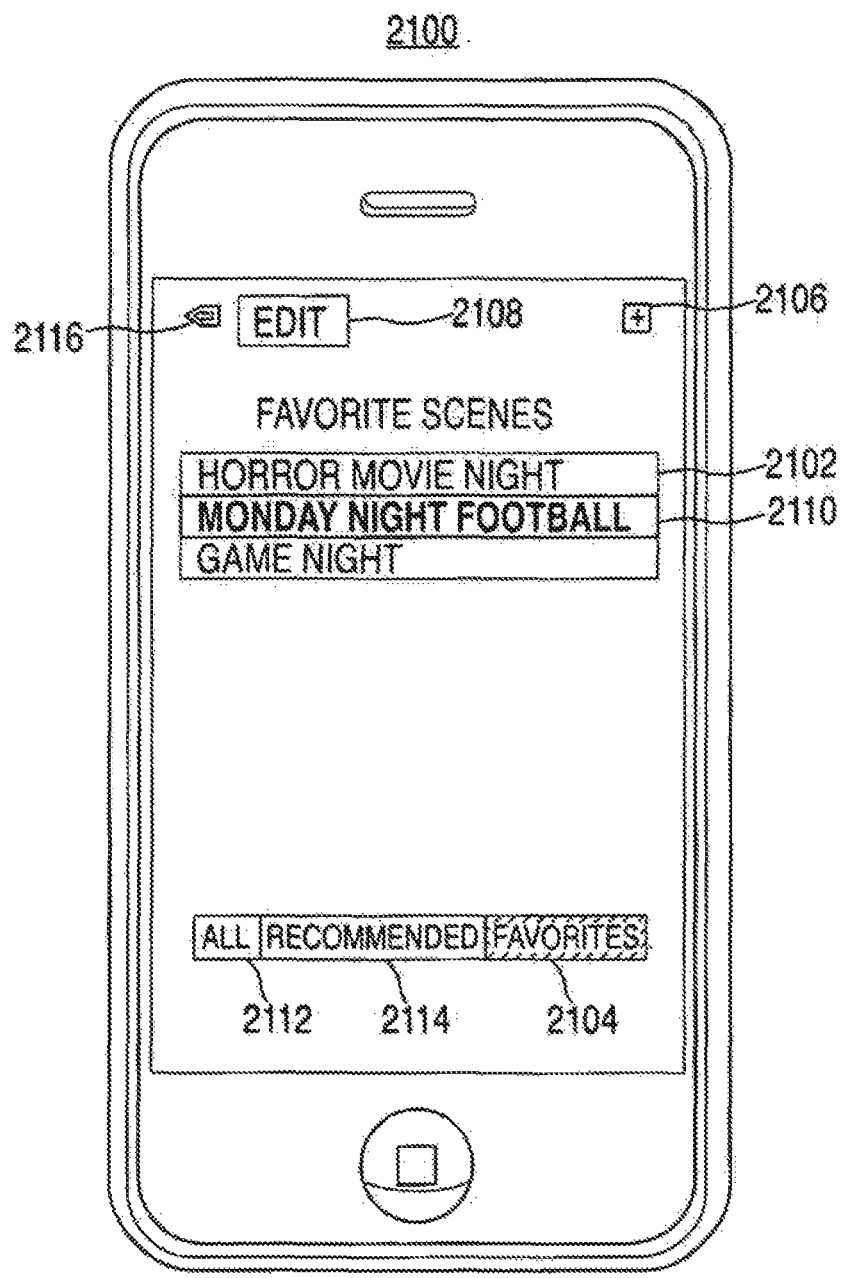
FIG. 21 shows a schematic view of an illustrative display screen for providing favorite scenes in accordance with one embodiment of the present invention.

In some embodiments, the user may access a listing of favorite scenes. FIG. 21 shows a schematic view of an illustrative display screen for providing favorite scenes in accordance with one embodiment of the present invention. The user may access display screen 2100 using any suitable approach, including, for example, selecting a "FAVORITES" option (e. g., "FAVORITES" option 1714 of FIG. 17 or "FAVORITES" option 2014 of FIG. 20).

Display screen 2100 can include listings 2102 of saved scenes that have been designated as favorite scenes. In some embodiments, "FAVORITES" option 2104 can be shaded to indicate that listings 2102 include favorite scenes. In some embodiments, the user may designate one or more saved scenes as favorite scenes. The user may, for example, select "ADD" option 2106 to add scenes to listings 2102. In response to receiving a selection of "ADD" option 2106, the portable electronic device can display saved scenes that are not currently designated as favorite scenes. The user may select one or more of these saved scenes to add to listings 2102. In some embodiments, the user may select "EDIT" option 2108 to delete one or more scenes from listings 2102. In some embodiments, the portable electronic device can automatically add the most frequently restored scenes to listings 2102.

In some embodiments, the user may select a scene in listings 2102 by placing highlight region 2110 over a listing. In response to the user selecting a scene, the portable electronic device can restore the scene.

Figure 22:
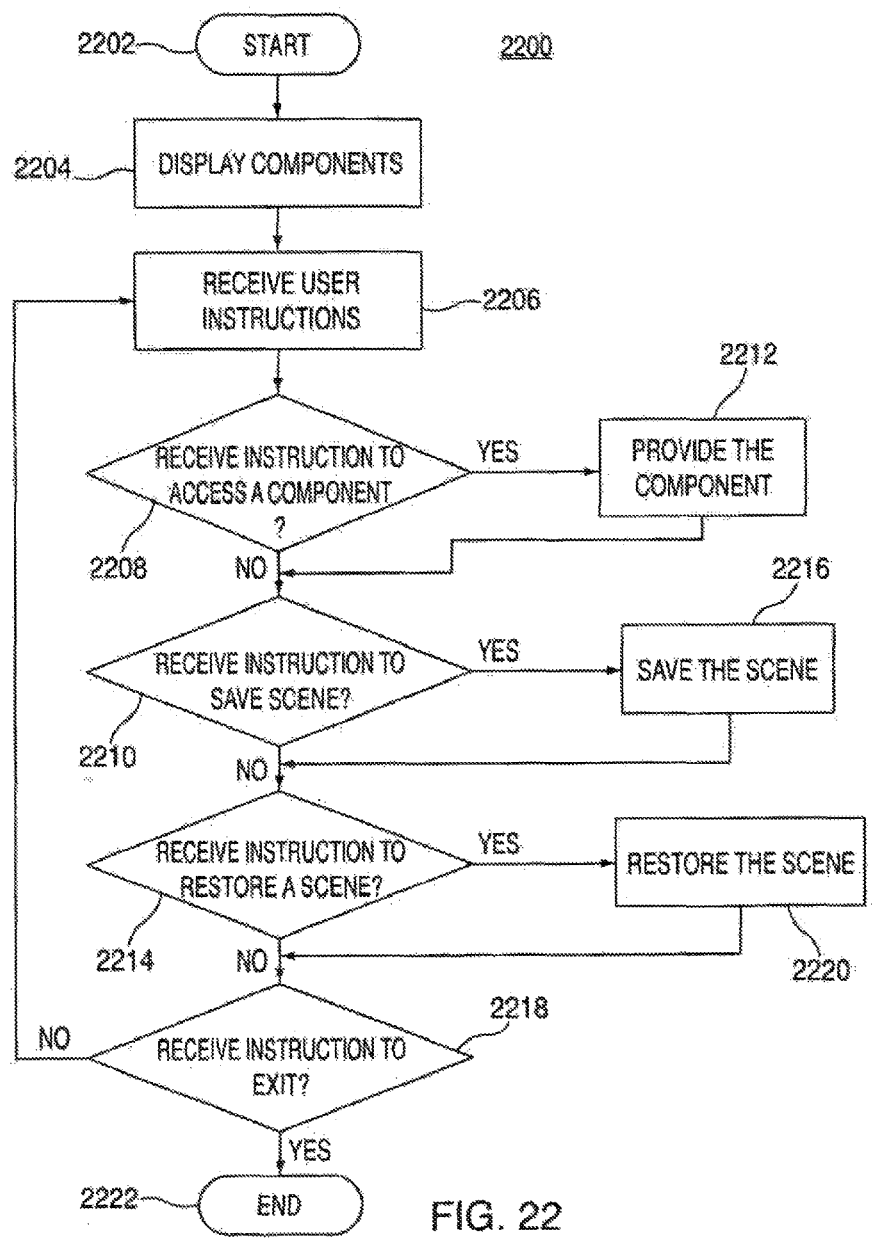
FIG. 22 shows a flowchart of an illustrative process for providing a user with the capability to save and restore scenes in a multimedia system in accordance with one embodiment of the present invention.

FIG. 22 shows a flowchart of an illustrative process for providing a user with the capability to save and restore scenes in a multimedia system in accordance with one embodiment of the present invention. Process 2200 starts at step 2202. At step 2204, a portable electronic device (e.g., portable electronic device 300 of FIG. 3) can display components in the multimedia system. In some embodiments, the portable electronic device can display all components that are available in the multimedia system. For example, the portable electronic device can provide display screen 800 (FIG. 8) to a user. In some embodiments, the portable electronic device can display components selected for a scene. For example, the portable electronic device can provide display screen 1500 (FIG. 15) to a user.

At step 2206, the portable electronic device can receive user instructions. At step 2208, the portable electronic device can determine whether an instruction to access a component in the multimedia system has been received. For example, the portable electronic device can determine whether the user has selected a component in listings 802

(FIG. 8) or listings 1502 (FIG. 15). As another example, the portable electronic device can determine whether the user has selected an application in listings 802 (e.g., using option 808) or listings 1502 (e.g., using option 1508). If, at step 2208, the portable electronic device determines that an instruction to access a component has not been received, process 2200 moves to step 2210. If, at step 2208, the portable electronic device instead determines that an instruction to access a component has been received, process 2200 moves to step 2212.

At step 2212, the portable electronic device can provide the selected component. For example, the portable electronic device can provide display screen 900 (FIG. 9), which can allow the user to adjust the state of a device. As another example, the portable electronic device can provide display screen 1000 (FIG. 10) which can allow the user to access one or more applications running on a device. The user may access a particular application by placing highlight region 1004 over a listing in listings 1002. After the user has finished adjusting the state of the component, the user may select "BACK" option 916 or "BACK" option 1008 to return to display screen 800 (FIG. 8). Process 2200 then moves to step 2210.

At step 2210, the portable electronic device can determine whether an instruction to save the scene has been received. For example, the portable electronic device can determine whether the user has selected "SAVE" option 810 (FIG. 8). If, at step 2210, the portable electronic device determines that an instruction to save the scene has not been received, process 2200 moves to step 2214.

If, at step 2210, the portable electronic device instead determines that an instruction to save the scene has been received, process 2200 moves to step 2216. At step 2216, the portable electronic device can save the scene. For example, the portable electronic device can store the states of the components included in the scene in memory (e.g., memory 304 of FIG. 3). After saving the scene, process 2200 moves to step 2214.

At step 2214, the portable electronic device can determine whether an instruction to restore a scene has been received. For example, the portable electronic device can determine whether the user has selected "VIEW SAVED" option 812 (FIG. 8). The user may then be taken to a display screen such as display screen 1700 (FIG. 17). The user may then select to restore a scene by placing highlight region 1706 over a listing in listings 1702. If, at step 2214, the portable electronic device determines that an instruction to restore a scene has not been received, process 2200 moves to step 2218.

If, at step 2214, the portable electronic device instead determines that an instruction to restore a scene has been received, process 2200 moves to step 2220. At step 2220, the portable electronic device can restore the scene. After restoring the scene, process 2200 moves to step 2218.

At step 2218, the portable electronic device can determine whether an instruction to exit has been received. For example, the user may select to exit process 2200 by selecting button 704 (FIG. 7). If, at step 2218, the portable electronic device determines that an instruction to exit has not been received, process 2200 moves back to step 2206, discussed previously. If, at step 2218, the portable electronic device instead determines that an instruction to exit has been received, process 2200 ends at step 2222.

Figure 23:
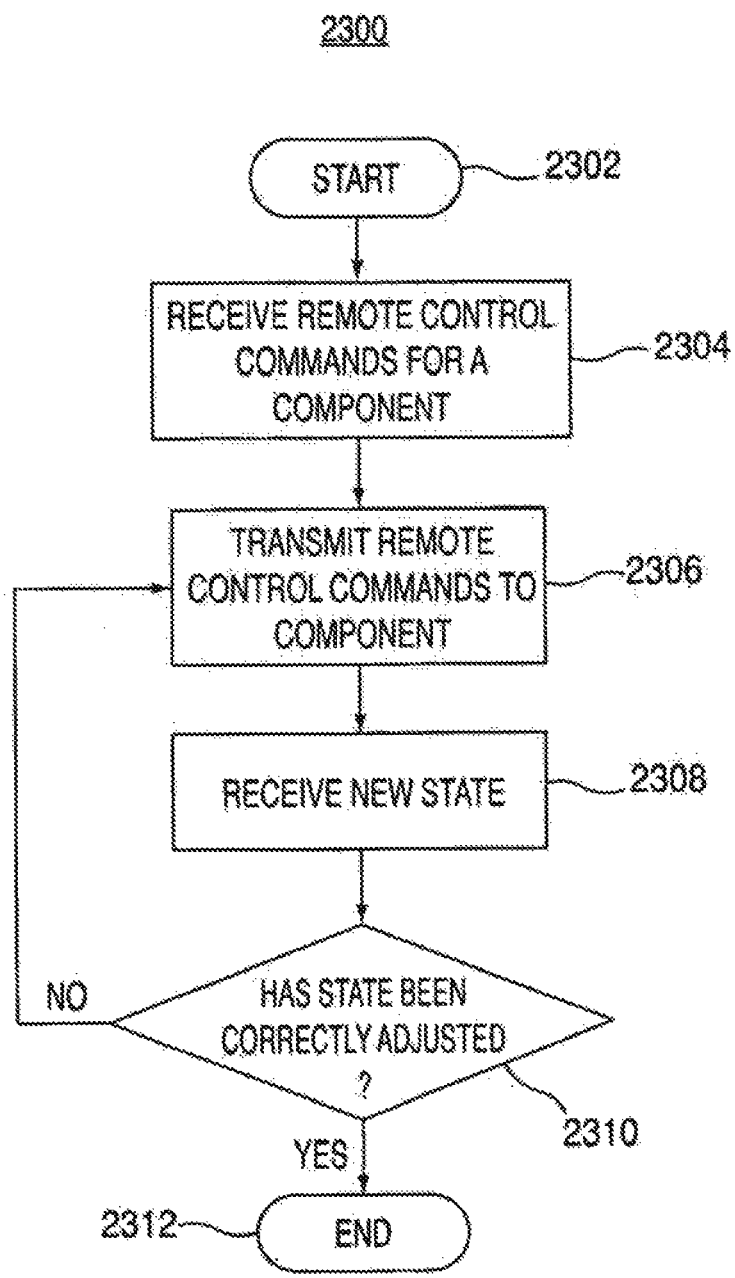
FIG. 23 shows a flowchart of an illustrative process for providing the controls of a component to a user in accordance with one embodiment of the present invention.

FIG. 23 shows a flowchart of an illustrative process for providing the controls of a component to a user in accordance with one embodiment of the present invention. In some embodiments, process 2300 can be implemented in step 2212 of process 2200 (FIG. 22).

Process 2300 starts at step 2302. At step 2304, the portable electronic device can receive remote control commands for a component. For example, remote control commands can be associated control options 902 or options 914 of FIG. 9. After the portable electronic device finishes receiving remote control commands, process 2300 moves to step 2306.

At step 2306, the portable electronic device can transmit the remote control commands to the component. For example, a remote client (e.g., remote client 616 of FIG. 6) on the portable electronic device can transmit the remote control commands to a server (e.g., server 612 or server 614 of FIG. 6) on the component. After the remote control commands are transmitted, process 2300 moves to step 2308.

At step 2308, the portable electronic device can receive new state from the component. For example, a server (e.g., server 612 or server 614) on a component can broadcast the new state to the portable electronic device. After receiving the new state, process 2300 moves to step 2310.

At step 2310, the portable electronic device can verify if the new state has been correctly adjusted based on the remote control commands. If, at step 2310, the portable electronic device determines that the new state has not been correctly adjusted, process 2300 moves back to step 2306. At step 2306, the portable electronic device can re-transmit the remote control commands to the component.

If, at step 2310, the portable electronic device instead determines that the new state has been correctly adjusted, process 2300 ends at step 2312. Persons skilled in the art will appreciate that process 2300 can be repeated for all components in a scene.

Figure 24:
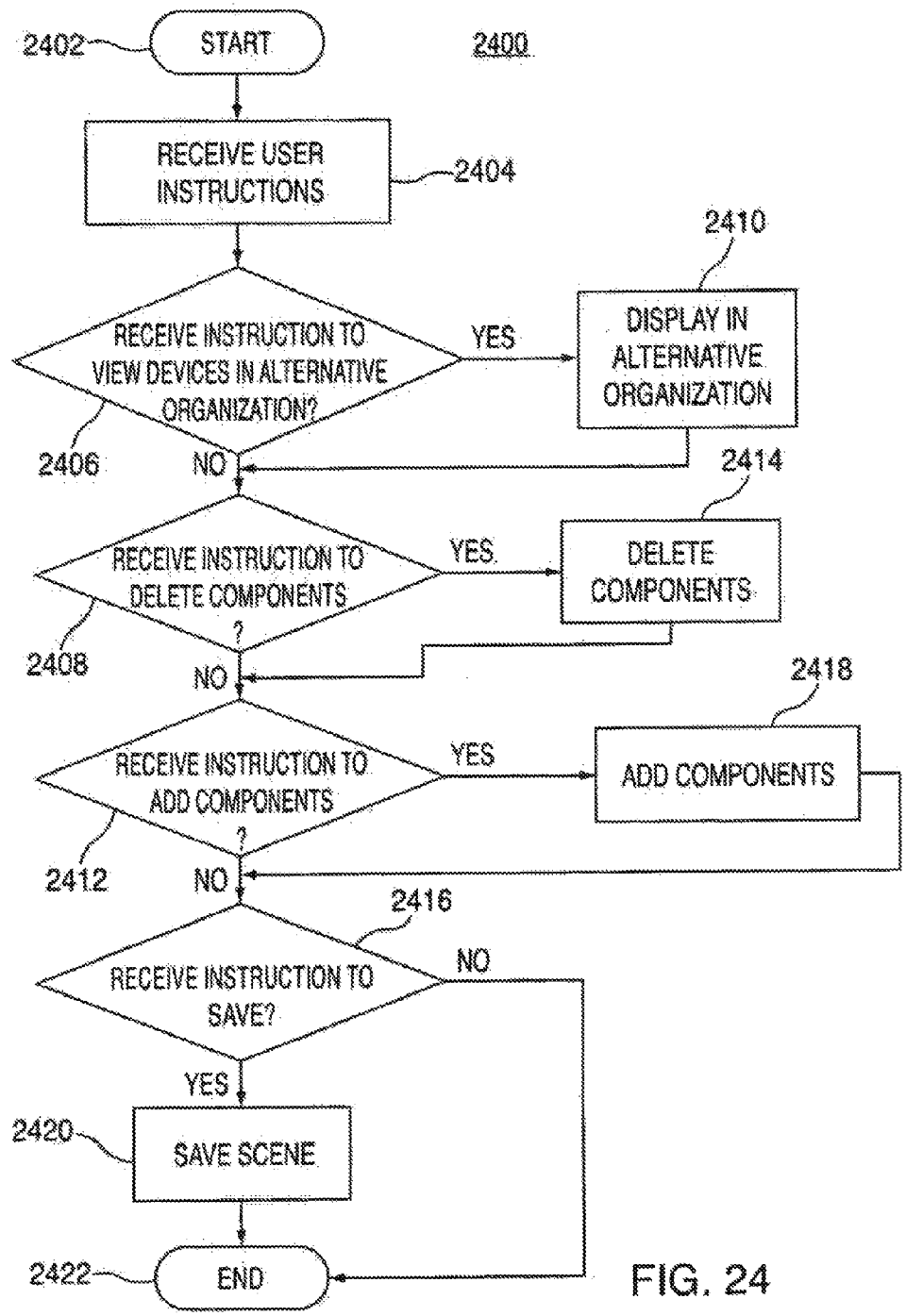
FIG. 24 shows a flowchart of an illustrative process for saving a scene in accordance with one embodiment of the present invention.

FIG. 24 shows a flowchart of an illustrative process for saving a scene in accordance with one embodiment of the present invention. In some embodiments, process 2400 can be implemented in step 2216 of process 2200 (FIG. 22).

Process 2400 starts at step 2402. At step 2404, the portable electronic device can receive user instructions. At step 2406, the portable electronic device can determine whether an instruction to view components in an alternative organization has been received. For example, portable electronic device can provide display screen 1100 (FIG. 11) to the user. Display screen 1100 can include listings 1102 and "VIEW" option 1106. In some embodiments, listings 1102 can include components that are organized based on their categories. In some embodiments, in response to the user selecting "VIEW" option 1106, the portable electronic device can organize the components based on a different criteria. If, at step 2406, the portable electronic device determines that an instruction to view the components in an alternative organization has not been received, process 2400 moves to step 2408. If, at step 2406, the portable electronic device instead determines that an instruction to view the components in an alternative organization has been received, process 2400 moves to step 2410.

At step 2410, the portable electronic device can display the components in an alternative organization. For example, the portable electronic device can provide display screen 1200 (FIG. 12) for components that are organized based on their locations. Process 2400 then moves to step 2408.

At step 2408, the portable electronic device can determine whether an instruction to delete one or more components from the scene has been received. For example, the portable electronic device can determine whether the user has selected to delete a component (e.g., the user has selected option 1108 and "DELETE" option 1110 of FIG. 11). If, at step 2408, the portable electronic device determines that an instruction to delete one or more components has not been received, process 2400 moves to step 2412. If, at step 2408, the portable electronic device instead determines that an instruction to delete one or more components has been received, process 2400 moves to step 2414.

At step 2414, the portable electronic device can delete the one or more components selected by the user. For example, in response to receiving an instruction to delete "TV1", the portable electronic device can delete "TV1" from listings 1102 (FIG. 11). The portable electronic device can then provide display screen 1300 (FIG. 13). Process 2400 then moves to step 2412.

At step 2412, the portable electronic device can determine whether an instruction to add one or more components to the scene has been received. For example, the portable electronic device can determine whether the user has selected to add a component (e.g., the user has selected "ADD DEVICE" option 1304 of FIG. 13). If, at step 2412, the portable electronic device determines that an instruction to add one or more components has not been received, process 2400 moves to step 2416. If, at step 2412, the portable electronic device instead determines that an instruction to add one or more components has been received, process 2400 moves to step 2418.

At step 2418, the portable electronic device can add the components that were selected by the user. For example, in response to the user selecting "ADD DEVICE" option 1304, the portable electronic device can provide display screen 1400 (FIG. 14) to the user. Display screen 1400 can include components in the multimedia system that can be controlled but are not included in the scene (e.g., components that may have been previously deleted by the user or components that may have recently been added to the multimedia system). The user may select to add one or more components (e.g., by selecting option 1404), and the portable electronic device can add the selected components to listings 1302 (FIG. 13). After the user has finished adding components to the scene, the user may select "BACK" option 1406 to return to display screen 1300. Process 2400 then moves step 2416.

At step 2416, the portable electronic device can determine whether an instruction to save a scene has been received. For example, the portable electronic device can determine whether the user has selected to save a scene by selecting a "SAVE" option (e.g., "SAVE" options 1112, 1206, and 1308 in FIGS. 11-13).

If, at step 2416, the portable electronic device determines that an instruction to save a scene has been received, process 2400 moves to step 2420. For example, in response to the user selecting a "SAVE" option, the portable electronic device can save the scene in a preference file that can be stored in memory (e.g., memory 304 of FIG. 3). In some embodiments, the portable electronic device can assign a label to the scene. For example, the user may enter a label in a text box (e.g., text boxes 1114, 1208, and 1306 in FIGS. 11-13). After saving the scene, process 2400 ends at step 2422.

If, at step 2416, the portable electronic device instead determines that an instruction to save the scene has not been received, process 2400 ends at step 2422. For example, the user may have selected a "BACK" option (e.g., "BACK" options 1116, 1210, and 1310 in FIGS. 11-13).

Figure 25A:
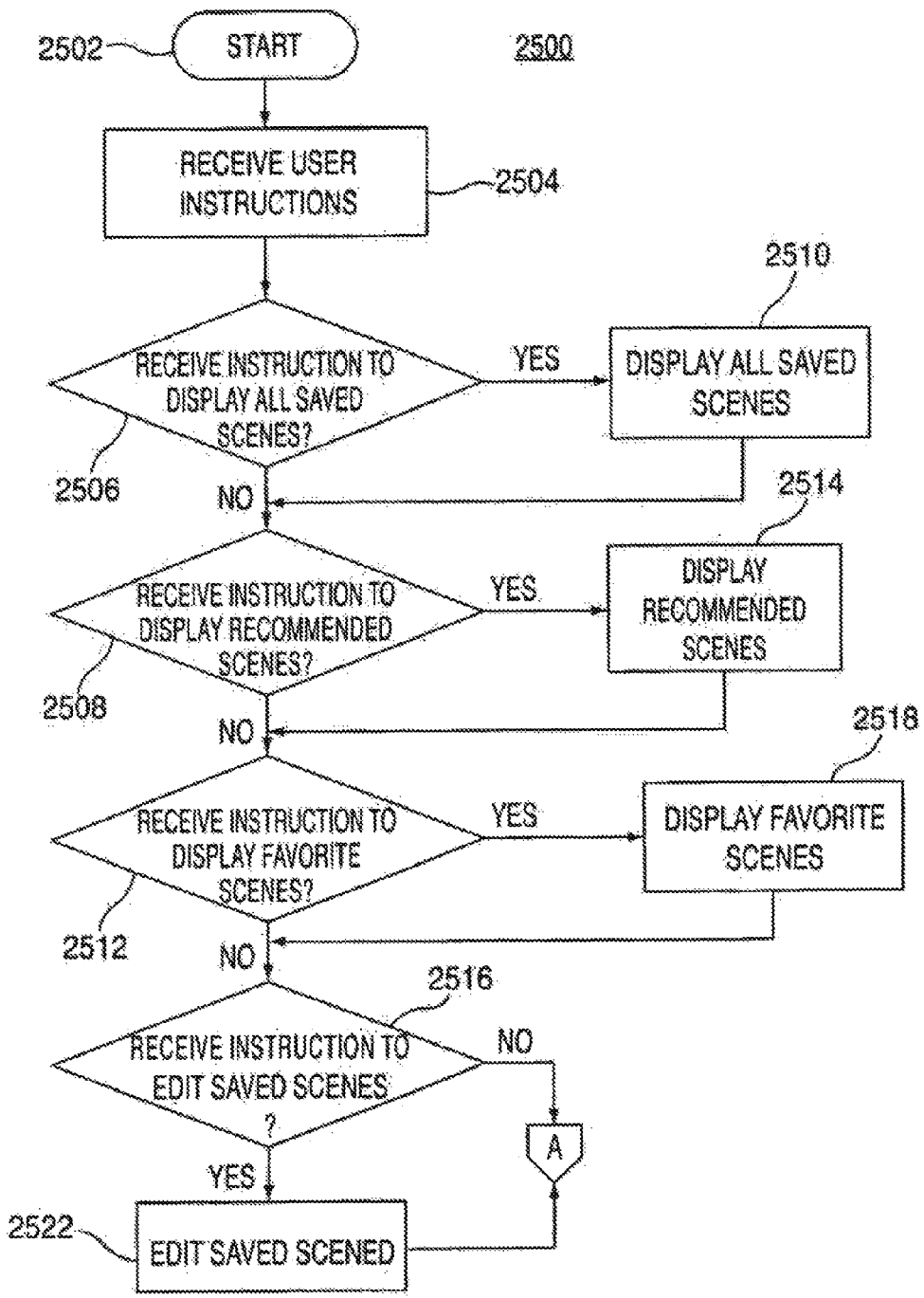
FIGS. 25A-25B show flowcharts of an illustrative process for restoring a scene in accordance with one embodiment of the present invention.
Figure 25B:
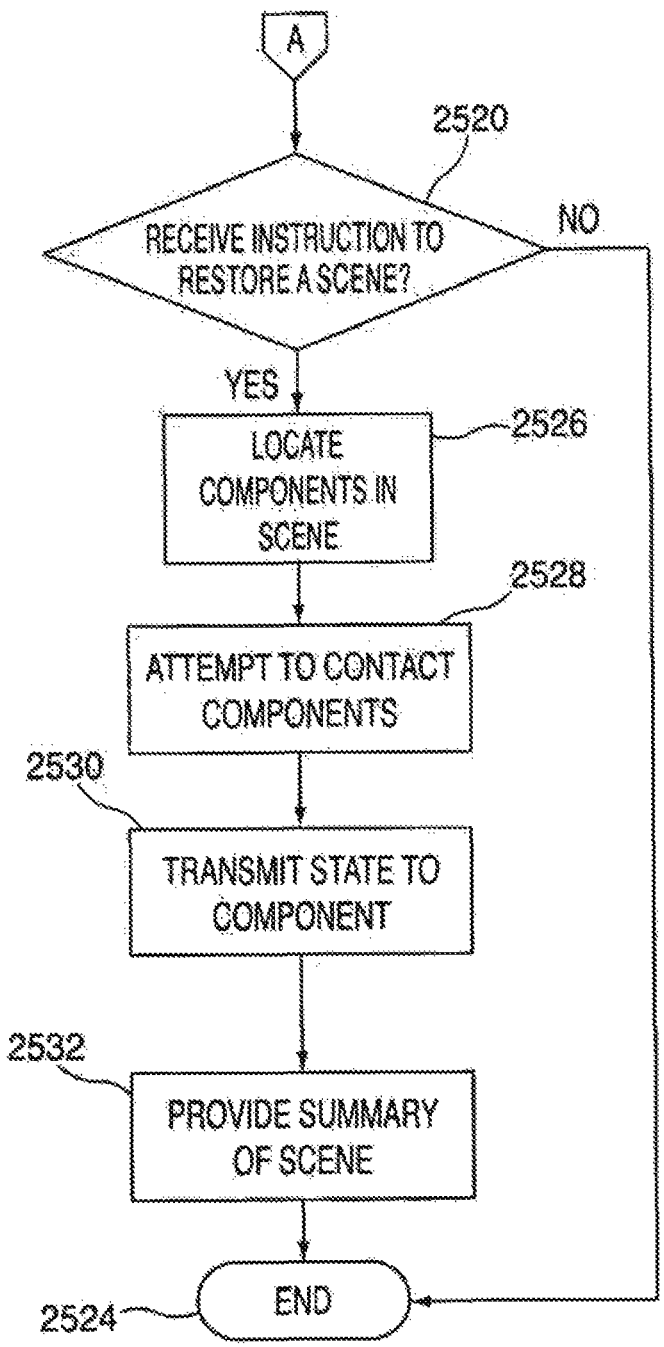

FIGS. 25A-25B show flowcharts of an illustrative process for restoring a scene in accordance with one embodiment of the present invention. In some embodiments, process 2500 can be implemented in step 2220 of process 2200 (FIG. 22).

Process 2500 starts at step 2502. At step 2504, the portable electronic device can receive user instructions. At step 2506, the portable electronic device can determine whether an instruction to display all saved scenes has been received. For example, the portable electronic device can determine whether the user has selected an "ALL" option (e.g., "ALL" options 1710, 2008, and 2112 in FIGS. 17, 20, and 21, respectively). If, at step 2506, the portable electronic device determines that an instruction to display all saved scenes has not been received, process 2500 moves to step 2508. If, at step 2506, the portable electronic device instead determines that an instruction to display all saved scenes has been received, process 2500 moves to step 2510.

At step 2510, the portable electronic device can display all saved scenes to the user. For example, the portable electronic device can provide the user with display screen 1700 (FIG. 17). Process 2500 then moves to step 2508.

At step 2508, the portable electronic device can determine whether an instruction to display recommended scenes has been received. For example, the portable electronic device can determine whether the user has selected a "RECOMMENDED" option (e.g., "RECOMMENDED" options 1712, 2004, and 2114 in FIGS. 17, 20, and 21, respectively). If, at step 2508, the portable electronic device determines that an instruction to display recommended scenes has not been received, process 2500 moves to step 2512. If, at step 2508, the portable electronic device instead determines that an instruction to display recommended scenes has been received, process 2500 moves to step 2514.

At step 2514, the portable electronic device can display recommended scenes to the user. In some embodiments, the portable electronic device can determine recommended scenes based on one or more parameters (e.g., states of components and/or usage patterns). In some embodiments, the portable electronic device can provide the user with display screen 2000 (FIG. 20). Process 2500 then moves to step 2512.

At step 2512, the portable electronic device can determine whether an instruction to display favorite scenes has been received. For example, the portable electronic device can determine whether the user has selected a "FAVORITES" option (e.g., "FAVORITES" options 1714, 2014, and 2104 in FIGS. 17, 20, and 21, respectively). If, at step 2512, the portable electronic device determines that an instruction to display favorite scenes has not been received, process 2500 moves to step 2516. If, at step 2512, the portable electronic device instead determines that an instruction to display favorite scenes has been received, process 2500 moves to step 2518.

At step 2518, the portable electronic device can display favorite scenes to the user. In some embodiments, the user may designate one or more saved scenes as favorite scenes. In some embodiments, the portable electronic device can provide the user with display screen 2100 (FIG. 21). Process 2500 then moves to step 2516.

At step 2516, the portable electronic device can determine whether an instruction to edit saved scenes has been received. For example, the portable electronic device can determine whether the user has selected "EDIT" option 1704. If, at step 2516, the portable electronic device determines that an instruction to edit saved scenes has not been received, process 2500 moves to step 2520. If, at step 2516, the portable electronic device instead determines that an instruction to edit saved scenes has been received, process 2500 moves to step 2522.

At step 2522, the portable electronic device can allow the user to edit the saved scenes. For example, the portable electronic device can allow the user to delete one or more saved scenes. Process 2500 then moves to step 2520.

At step 2520, the portable electronic device can determine whether an instruction to restore a scene has been received. For example, the portable electronic device can determine whether the user has selected a scene by placing highlight region 1706 over a listing in listings 1702 (FIG. 17). If, at step 2520, the portable electronic device determines that an instruction to restore a scene has not been received, process 2500 ends at step 2524. For example, the user may have selected a "BACK" option (e.g., "BACK" options 1716, 2016, and 2116 in FIGS. 17, 20, and 21).

If, at step 2520, the portable electronic device instead determines that an instruction to restore a scene has been received, process 2500 moves to step 2526.

At step 2526, the portable electronic device can locate components in the scene. For example, the portable electronic device can inspect the preference file of the scene, and find the components that are listed in the preference file. After locating the components, process 2500 moves to step 2528.

At step 2528, the portable electronic device can attempt to contact each of the components in the scene. For example, the portable electronic device can verify if the servers on the components are broadcasting identifiers. After attempting to contact each of the components, process 2500 moves to step 2530.

At step 2530, the portable electronic device can transmit the states to the components. For example, if a component is available, the portable electronic device can obtain the saved state of the component from the preference file, and transmit the saved state to the component (e.g., via remote client 616 of FIG. 6). After transmitting the states, process 2500 moves to step 2532.

At step 2532, the portable electronic device can provide a summary of the scene that has been restored. For example, the portable electronic device can provide the user with display screen 1800 (FIG. 18). In some embodiments, the portable electronic device can display message alerts (e.g., message alert 1806) for components that can not be contacted. Process 2500 ends at step 2524.

Figure 26:
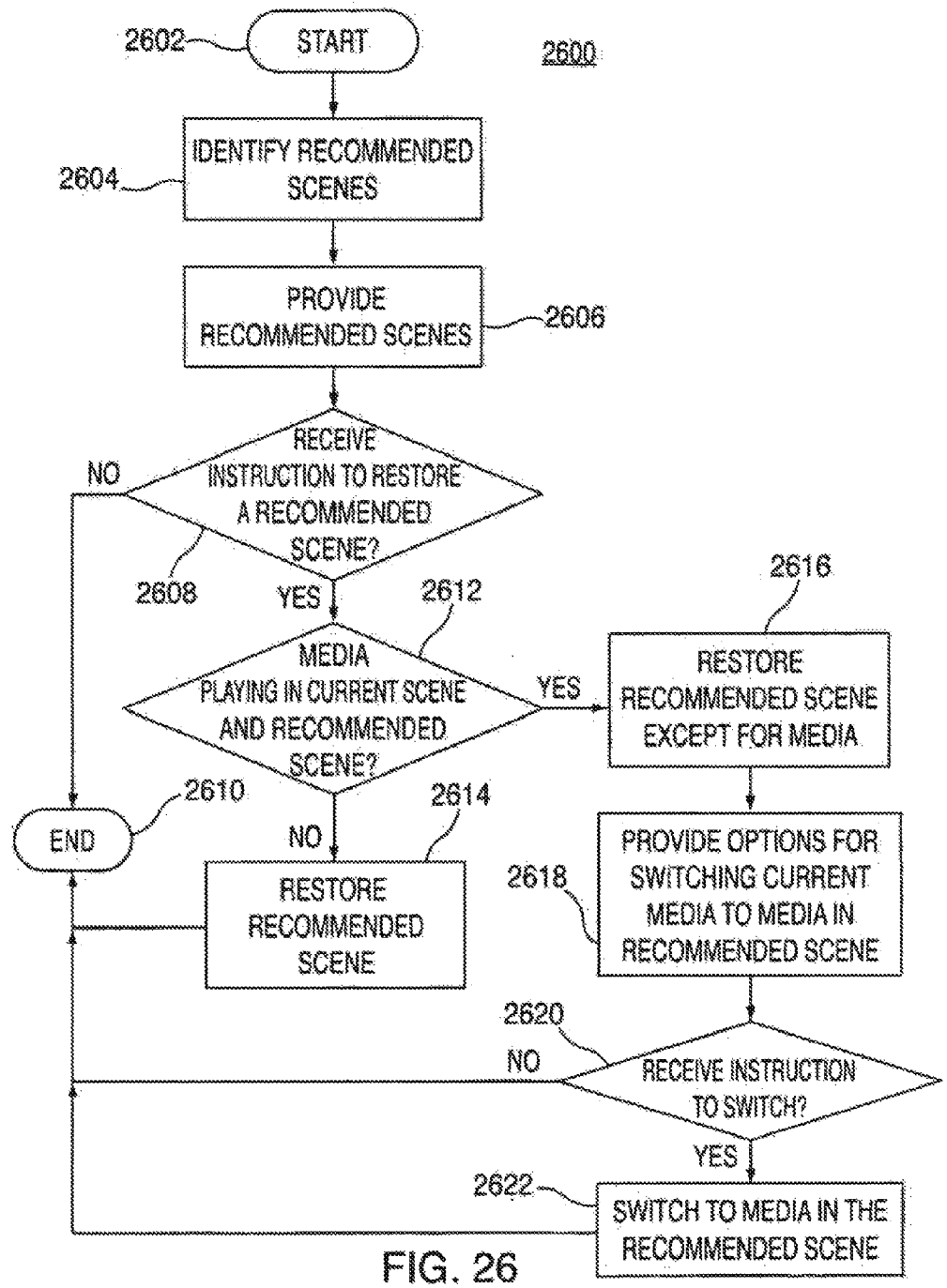
FIG. 26 shows a flowchart of an illustrative process for providing recommended scenes in accordance with one embodiment of the present invention.

FIG. 26 shows a flowchart of an illustrative process for providing recommended scenes in accordance with one embodiment of the present invention. In some embodiments, process 2600 can be implemented in step 2514 of process 2500 (FIG. 25).

Process 2600 starts at step 2602. At step 2604, the portable electronic device can identify recommended scenes. In some embodiments, the portable electronic device can search for recommended scenes based on states of components in the current scene. For example, the portable electronic device can determine metadata (e.g., genre) associated with the media that is currently playing. The portable electronic device can then search for components in the saved scenes that are also playing media similar to the media that is currently playing (e.g., same genre or episodes of the same television show). In some embodiments, the portable electronic device can search for recommended scenes based on usage patterns. For example, the portable electronic device can determine the current date and time (e.g., day parting). Based on this information, the portable electronic device can search for saved scenes that were accessed the most for that particular date or time (or period of time). After the portable electronic devices has finished searching for recommended scenes, process 2600 moves to step 2606.

At step 2606, the portable electronic device can provide the recommended scenes to the user. For example, the portable electronic device can provide the user with display screen 2000 (FIG. 20). After providing the recommended scenes, process 2600 moves to step 2608.

At step 2608, the portable electronic device can determine whether an instruction to restore a recommended scene has been received. For example, the user may select a recommended scene by placing highlight region 2006 over a listing in listings 2002. If, at step 2608, the portable electronic device determines that an instruction to restore a recommended scene has not been received, process 2600 ends at step 2610.

If, at step 2608, the portable electronic device instead determines that an instruction to restore a recommended scene has been received, process 2600 moves to step 2612.

At step 2612, the portable electronic device can determine if media is playing in the current scene and in the recommended scene. If, at step 2612, the portable electronic device determines that media is not playing in both scenes, process 2600 moves to step 2614.

At step 2614, the portable electronic device can restore the recommended scene. After restoring the recommended scene, process 2600 ends at step 2610.

If, at step 2612, the portable electronic device instead determines that media is playing in both scenes, process 2600 moves to step 2616. At step 2616, the portable electronic device can restore most of the components' states in the recommended scene except for the media.

At step 2618, the portable electronic device can provide options for switching the current media to media in the recommended scene. For example, the portable electronic device can display "YES" option 2010 and "NO" option 2012 (FIG. 20). In some embodiments, the portable electronic device can wait for a break in the media (e.g., commercial break or break between songs) before providing the options. After providing the options, process 2600 moves to step 2620.

At step 2620, the portable electronic device can determine whether an instruction to switch the media has been received. For example, the user may select "YES" option 2010 to switch to the media in the recommended scene, and "NO" option 2012 to continue playing the current media. If, at step 2620, the portable electronic device determines that an instruction to switch the media has not been received, process 2600 ends at step 2610.

If, at step 2620, the portable electronic device instead determines that an instruction to switch the media has been received, process 2600 moves to step 2622. At step 2622, the portable electronic device can switch to the media in the recommended scene. After switching the media, process 2600 ends at step 2610.

Thus it is seen that systems and methods are provided for saving and restoring scenes in a multimedia system with minimal configuration. It is also seen that systems and methods are provided for providing suggestions of suitable recommended scenes based on states of components and usage patterns. Persons skilled in the art will appreciate that the invention can be practiced by other than the described embodiments, which are presented for purposes of illustration and not of limitation, and the present invention is limited only by the claims which follow.

The invention claimed is:

1. A method implemented in one or more electronic devices, the method comprising:
 receiving current state information from each of a plurality of components controllable by the one or more electronic devices;

comparing the current state information to saved state information associated with a plurality of saved scenes;
identifying one or more of the saved scenes as a recommended scene based on a result of the comparing;
presenting a user interface having a control element operable to select one of the one or more recommended scenes as a scene to restore; and
in response to user operation of the control element, restoring the selected scene.

2. The method of claim 1, wherein restoring the selected scene comprises sending a control command to at least one of the components to change a current state of the component to correspond to the saved state information associated with the selected scene.

3. The method of claim 2, wherein restoring the selected scene further comprises:
detecting that a first component for which saved state information is associated with the selected scene is not available; and
providing a recommendation to the user for one or more alternative components to substitute for the first component.

4. The method of claim 1, wherein the plurality of components includes at least two of:
a television;
a speaker;
a light fixture;
a media device;
a window shade; or
a fireplace.

5. The method of claim 1, further comprising:
determining a usage pattern associated with the saved scenes; and
recommending to the user that one of the plurality of saved scenes be restored based on the usage pattern.

6. The method of claim 5, wherein the usage pattern is based at least in part on a frequency of restoring the saved scene as a function of one or more of a particular time of day, a particular day of week, or a particular day of year.

7. The method of claim 5, further comprising:
receiving a user input indicating that the recommended saved scene should be restored; and
restoring the recommended saved scene in response to the user input.

8. The method of claim 7, wherein restoring the recommended saved scene includes sending a control command to at least one of the components to change a current state of the component to correspond to the saved state information associated with the recommended saved scene.

9. The method of claim 1, wherein the current state information comprises one or more of:
an on/off state of one or more of the plurality of components;
metadata associated with media content that is playing on one or more of the plurality of components; or
a volume setting for one or more of the plurality of components.

10. One or more non-transitory computer-readable storage medium storing computer executable instructions that, when executed by one or more processors, configures the one or more processors to perform instructions comprising:
receiving current state information from each of a plurality of components controllable by the one or more electronic devices;
comparing the current state information to saved state information associated with a plurality of saved scenes;
identifying one or more of the saved scenes as a recommended scene based on a result of the comparing; presenting a user interface having a control element operable to select one of the one or more recommended scenes as a scene to restore; and in response to user operation of the control element, restoring the selected scene.

11. The one or more non-transitory computer-readable storage medium of claim 10, wherein restoring the selected scene comprises sending a control command to at least one of the components to change a current state of the component to correspond to the saved state information associated with the selected scene.

12. The one or more non-transitory computer-readable storage medium of claim 11, wherein restoring the selected scene further comprises: detecting that a first component for which saved state information is associated with the selected scene is not available; and providing a recommendation to the user for one or more alternative components to substitute for the first component.

13. The one or more non-transitory computer-readable storage medium of claim 10, wherein the instructions further comprise: determining a usage pattern associated with the saved scenes; and recommending to the user that one of the plurality of saved scenes be restored based on the usage pattern, wherein the usage pattern is based at least in part on a frequency of restoring the saved scene as a function of one or more of a particular time of day, a particular day of week, or a particular day of year.

14. The one or more non-transitory computer-readable storage medium of claim 12, wherein the instructions further comprise: receiving a user input indicating that the recommended saved scene should be restored; and restoring the recommended saved scene in response to the user input.

15. The one or more non-transitory computer-readable storage medium of claim 14, wherein restoring the recommended saved scene includes sending a control command to at least one of the components to change a current state of the component to correspond to the saved state information associated with the recommended saved scene.

16. The one or more non-transitory computer-readable storage medium of claim 10, wherein the current state information comprises one or more of: an on/off state of one or more of the plurality of components; metadata associated with media content that is playing on one or more of the plurality of components; or a volume setting for one or more of the plurality of components.

17. A system, comprising:
a user interface;
one or more memory devices; and
one or more processors coupled to the user interface and the one or more memory devices, the one or more processors being configured to:
receive current state information from each of a plurality of components controllable by the one or more electronic devices;
compare the current state information to saved state information associated with a plurality of saved scenes;
identify one or more of the saved scenes as a recommended scene based on a result of the comparing;
present, at the user interface, a control element operable to select one of the one or more recommended scenes as a scene to restore; and
in response to user operation of the control element, restore the selected scene.

18. The system of claim 17, wherein restoring the selected scene comprises sending a control command to at least one of the components to change a current state of the component to correspond to the saved state information associated with the selected scene.

19. The system of claim 18, wherein restoring the selected scene further comprises:
- detecting that a first component for which saved state information is associated with the selected scene is not available; and
- providing a recommendation to the user for one or more alternative components to substitute for the first component.

20. The system of claim 17, wherein the one or more processors are further configured to:
- determine a usage pattern associated with the saved scenes; and
- recommend to the user that one of the plurality of saved scenes be restored based on the usage pattern, wherein the usage pattern is based at least in part on a frequency of restoring the saved scene as a function of one or more of a particular time of day, a particular day of week, or a particular day of year.

* * * * *